United States Patent [19]

Ogawa et al.

[11] Patent Number: 4,931,940

[45] Date of Patent: Jun. 5, 1990

[54] ROTATIONAL POSITION DETECTOR FOR CONTROLLING AN INTERNAL COMBUSTION ENGINE

[75] Inventors: Sumitaka Ogawa, Oomiya; Tatsuo Hayashi, Tokyo, both of Japan

[73] Assignee: Honda Giken Kogyo Kabushiki Kaisha, Tokyo, Japan

[21] Appl. No.: 201,433

[22] Filed: Jun. 2, 1988

[30] Foreign Application Priority Data

| | | | |
|---|---|---|---|
| Jun. 5, 1987 | [JP] | Japan | 62-139694 |
| Aug. 25, 1987 | [JP] | Japan | 62-211046 |
| Oct. 21, 1987 | [JP] | Japan | 62-267319 |

[51] Int. Cl.[5] ..................... G01M 15/00; F02P 5/145; G06F 15/20

[52] U.S. Cl. ............................... 364/431.03; 364/559; 364/431.04; 123/414; 73/116

[58] Field of Search .......................... 73/116; 123/414; 324/169; 364/431.03, 426.04, 424.1, 559; 264/431.04

[56] References Cited

U.S. PATENT DOCUMENTS

| | | | |
|---|---|---|---|
| 4,114,574 | 9/1978 | Platzer, Jr. | 123/117 R |
| 4,181,884 | 1/1980 | Shirasaki et al. | 324/208 |
| 4,197,585 | 4/1980 | Moorey et al. | 364/565 |
| 4,216,419 | 8/1980 | van Dam et al. | 318/327 |
| 4,249,493 | 2/1981 | Honig et al. | 123/416 |
| 4,303,984 | 12/1981 | Houvig | 364/571 |
| 4,366,541 | 12/1982 | Mouri et al. | 364/431.05 |
| 4,385,605 | 5/1983 | Petrie et al. | 123/414 |
| 4,385,611 | 5/1983 | Harper et al. | 123/480 |
| 4,418,392 | 11/1983 | Hata | 364/57 |
| 4,517,831 | 5/1985 | Hirano | 73/116 |
| 4,553,426 | 11/1985 | Capurka | 73/116 |
| 4,553,427 | 11/1985 | Kuraoka et al. | 123/414 |
| 4,558,591 | 12/1985 | Francis et al. | 73/116 |
| 4,581,713 | 4/1986 | Fennel | 364/571 |
| 4,583,507 | 4/1986 | Greeves et al. | 73/116 |
| 4,633,419 | 12/1986 | Niiho et al. | 364/559 |
| 4,669,052 | 5/1987 | Bianco | 364/571 |
| 4,787,354 | 11/1988 | Wilens et al. | 123/414 |
| 4,797,827 | 1/1989 | Cockerham | 364/431.03 |
| 4,799,380 | 1/1989 | Suzuki et al. | 324/169 |

FOREIGN PATENT DOCUMENTS

| | | |
|---|---|---|
| 0115827 | 8/1984 | European Pat. Off. . |
| 2836479 | 3/1979 | Fed. Rep. of Germany . |

*Primary Examiner*—Felix D. Gruber
*Assistant Examiner*—V. Trans

[57] ABSTRACT

A rotational position detector for controlling an internal combustion engine comprises a rotary body rotatable in synchronism with internal combustion engine operation. A plurality of detectable portions is disposed on the rotary body. A pulse generator is operatively positioned adjacent to the rotary body for generating a pulse each time one of the detectable portions on the rotary body passes the pulse generator. A measuring device measures time intervals between respective pulses. An increase/decrease discriminator is provided to compare previous and current values of the output of the measuring device to check for an increase or decrease therein. A memory stores the output of the increase/decrease discriminator for a predetermined period in an increase/decrease pattern. A comparator compares the increase/decrease pattern with a predetermined increase/decrease pattern and develops an output for controlling the operation of the internal combustion engine.

8 Claims, 33 Drawing Sheets

FIG. 3

| PULSE NUMBER | NORMAL BIT PATTERN P | | | | | |
|---|---|---|---|---|---|---|
| | BINARY NOTATION | | | | | HEXADECIMAL NOTATION |
| 1 | --- | 1 1 1 0 | 1 0 0 1 | 1 1 0 1 | 0 0 1 1 | E9D3 |
| 2 | --- | 1 1 0 1 | 0 0 1 1 | 1 0 1 0 | 0 1 1 1 | D3A7 |
| 3 | --- | 1 0 1 0 | 0 1 1 1 | 0 1 0 0 | 1 1 1 0 | A74E |
| 4 | --- | 0 1 0 0 | 1 1 1 0 | 1 0 0 1 | 1 1 0 1 | 4E9D |
| 5 | --- | 1 0 0 1 | 1 1 0 1 | 0 0 1 1 | 1 0 1 0 | 9D3A |
| 6 | --- | 0 0 1 1 | 1 0 1 0 | 0 1 1 1 | 0 1 0 0 | 3A74 |
| 7 | --- | 0 1 1 1 | 0 1 0 0 | 1 1 1 0 | 1 0 0 1 | 74E9 |

FIG. 9

| COUNT SLIP NUMBER | BIT PATTERN P | | | | |
|---|---|---|---|---|---|
| | BINARY NOTATION | | | | HEXADECIMAL NOTATION |
| | Ts1 | Ts2 | Ts3 | Ts4 | |
| 0 NORMAL | 1 | 0 | 1 | 0 | A |
| 1 | 0 | 1 | 1 | 1 | 7 |
| 2 | 0 | 1 | 1 | 1 | 7 |
| 3 | 0 | 1 | 1 | 0 | 6 |
| 4 | 0 | 1 | 1 | 0 | 6 |
| 5 | 0 | 1 | 1 | 0 | 6 |
| 6 | 0 | 1 | 1 | 0 | 6 |
| 7 | 0 | 1 | 0 | 0 | 4 |
| 8 | 0 | 1 | 0 | 0 | 4 |

FT : COMPRESSION PEAK POSITION OF FRONT CYLINDER IN V2 CYLINDERED ENGINE

RT : COMPRESSION PEAK POSITION OF REAR CYLINDER IN V2 CYLINDERED ENGINE

FT : COMPRESSION PEAK POSITION OF FRONT CYLINDER IN V2 CYLINDERED ENGINE

RT : COMPRESSION PEAK POSITION OF REAR CYLINDER IN V2 CYLINDERED ENGINE (FT) : EXHAUST PEAK POSITION OF FRONT CYLINDER IN V2 CYLINDERED ENGINE (RT) : EXHAUST PEAK POSITION OF FRONT CYLINDER IN V2 CYLINDERED ENGINE

ROTATIONAL POSITION DETECTOR FOR CONTROLLING AN INTERNAL COMBUSTION ENGINE

BACKGROUND OF THE INVENTION

1. Field of the Invention

This invention relates to a rotational position detector useful for the electronic control of an internal combustion engine. In addition, a device is disclosed for detecting the rotational angular position of a rotating body for engine control, employing a control system for processing pulses which are generated by means of a plural number of detectable portions provided around the circumference of a rotating body like the engine crankshaft and a sensor located adjacent to the rotating body. Further, a device is disclosed for detecting a reference position on a rotating body, wherein a reference position of pulses representing angular information is given by a nonuniformly spaced portion for a signal generating means of a rotary body of a crank angle sensor or the like to be used as a vehicle control unit, for electrically detecting the rotational angle or the number of revolutions of the rotary body on the basis of the reference position.

2. Description of Background Art

For controlling operations of an internal combustion engine by electronic control units such as, for example, a fuel injection control unit or an ignition timing control unit, it is necessary to detect accurately the rotational position of the engine, for example, the angular position of the engine crankshaft. A rotational position detector or sensor of this sort is known, for example, from U.S. Pat. No. 4,553,426.

The conventional detector is arranged to generate pulse trains partly containing a nonuniformly spaced interval in synchronism with rotation of a rotary body, detecting a predetermined angular position of the rotary body from the condition of generated pulse trains, and upon detection producing a reference pulse separately from the pulse trains, and verifying the correctness of the reference pulses by producing a verified reference pulse when a count of pulses of a pulse train between a reference pulse and a preceding reference pulse equals a predetermined number. A conventional detector has a problem in that the detection of the rotational position lacks adaptability to high speed rotations, in addition to incapability of instantly distinguishing abnormalities in the results of detection.

Namely, when the rotation of the rotary body contains fluctuations as experienced during engine operations, complicate computations are required for generation of the reference pulses, failing to adapt the detection process to high engine speeds while taking time for performing necessary arithmetic operations.

Besides, the verification of the reference pulses, namely, the verification of the correctness of the pulse count of the pulse train necessitates operations for discrimination of the reference pulses and collation of the pulse counts of the pulse trains, which cause a further delay before generation of the verified reference pulses and impose adverse effects in a greater degree at higher engine speeds.

Further, the correctness of the detected reference positions is verified only on occurrence of the reference pulses so that it is difficult to detect promptly an error which might occur to the pulse count of the pulse train between the two reference pulses, namely, to the detected rotational position, resulting in a delay in discriminating abnormalities which take place during the detection process.

Heretofore, there have been in use various vehicle engine control systems, which invariably have a difficulty in performing required arithmetic operations in response to quick variations since the period of the arithmetic operation becomes very short at high speed rotations.

In order to eliminate this problem, Japanese Patent Publication No. 61-33984 discloses a system, including, as shown in FIGS. 21 and 22, three projections 2B protruded at uniform intervals of 120 degrees from the circumference of a disk 1B which is mounted on an engine crankshaft 2B. The projections 2B are formed of a magnetic material to cooperate with an electromagnetic pickup 3B having a coil winding around a magnet and located closely to the circumference of the disk 1B which carries the projections 2B. This electromagnetic pickup 3B is connected to a shaper 4B to induce a reference signal in the electromagnetic pickup at a time point when each one of the projections 2B on the disk 1B is passed across the front side of the electromagnetic pickup 3B, amplifying and shaping the reference signal to produce a reference pulse signal. A processor 5B is connected to the output of the shaper 4B to supply thereto the reference pulse signal as an input for performing arithmetic operations software-wise. In addition, various sensors 6B are also connected to the input of the processor to provide other controlling input signals. A presettable downcounter 7B and an R-S flip-flop 8B are connected in parallel to the output of the processor 5B, connecting the output of the presettable downcounter 7B to the input terminal (R) of the R-S flip-flop 8B, while connecting a clock pulse generator 9B of a predetermined frequency to the input of the presettable downcounter 7B. Connected to the output of the R-S flip-flop 8B is an amplifier 10B which has its output terminal connected to an electromagnetic injection valve 11B.

With this system, reference signals are produced at the output terminal A of the shaper 4B in synchronism with the rotation of the engine crankshaft. The reference pulse signal is applied to an interrupt request terminal INT of the processor 5B, so that, as shown in the flowchart of FIG. 22, the processor 5B receives an interrupt request each time a reference pulse signal is applied (Step 12B), reading in the information of a rotational speed (the number of engine revolutions) sensor among a group of sensors B to check if the rotational speed is higher than a predetermined speed, for example, higher than 3000 r.p.m. (Step 13B), setting "0" for the initial value i to be used in this processing if lower than the predetermined speed (3000 r.p.m.) (Step 14B), followed by executing part of the arithmetic operation for computing the fuel injection period (Step 15B), next making a check to see if the initial value i is "0" (Step 16B), advancing in the direction of YES since the initial value i was set to zero at Step 14B, setting the addressing value to w1 and specifying that part of the arithmetic operation was executed at Step 15B. Step 17B executes the remainder of the arithmetic operation performed at Step 15B. Step 18B sends the results of the arithmetic operation as an input to the presettable downcounter (Step 19B), and ending the interrupt processing (Step 20B).

On the other hand, if the engine revolution is higher then the predetermined speed (3000 r.p.m), the sequence is branched from Step 13B, setting the initial value i to "1" and jumping to Step 15B if the addressing value ADR was set to w1 and to Step 17B if the addressing value ADR was set to w2 (Step 21B). Further, when the initial value i is "1", the processing line is branched from Step 16B, setting the addressing value to w2 and specifying that the next arithmetic operation is processed at Step 18B (Step 22).

At a time point when the output of the processor 5B is received by the presettable downcounter 7B, the R-S flip-flop 8B is set, and the downcounter 7B immediately initiates down counting in response to clock pulses from the generator 9B, producing a borrow signal at a time point when the memory content becomes zero to reset the R-S flip-flop 8B. Therefore, the R-S flip-flop produces a set output C of a time width proportional to the computed value provided as an output of the processor 5B. This set output C of the R-S flip-flop 8B is amplified by the amplifier 10B and applied to the electromagnetic valve 11B as an open valve signal.

Heretofore, there have been known engine crankshaft angle detectors for operating the ignition and fuel injection units of an engine, which are generally arranged to discriminate grooves or projections provided on a circumferential portion of a disk-like rotary body by means of a closely located sensor.

As discussed above, U.S. Pat. No. 4,553,426 discloses a device of this sort, in which grooves or projections are provided on the circumference of a rotary body at uniform intervals except for a nonuniformly spaced portion.

More specifically, as shown in FIG. 40, rectangular projections 3C are provided at uniform intervals around the circumference of a rotary body 2C to serve as an engine control system 1C, omitting the rectangular projection in one position to form a nonuniformly spaced interval 4C. A sensor 6C is located in a position adjacent to the rotary body 2C, with a sensitive side of the sensor positioned toward the rectangular projections 3C. Connected to the output of the sensor 6C through a connection terminal A is a buffer, synchronizer and shaper circuit 7C, and connected to the output of the buffer, synchronizer and shaper circuit 7C through a connection terminal B are a pulse lack sensor 8C for detecting the nonuniformly spaced portion 4C, a verification circuit 9C which is also connected through a connection terminal C at the output of the pulse lack sensor 8C, and an engine control circuit 10C for wiring output line 10*a* to control units on the engine. In the verification circuit 9C, the input of a counter 11C is connected to the output of the buffer, synchronizer and shaper circuit 7C through the connecting terminal B, with output terminals $Q_1$, $Q_2$ and $Q_6$ of the counter 11C connected to the input terminals of AND gate 12C. The output of AND gate 12C is connected through a connection terminal E to the input of another AND gate 13C. The output of AND gate 13C is connected through connection terminal F to the input of the engine control circuit 10C. Line 15C branched from the connection terminal C and line 16C branched from the connection terminal E are connected to the input of logic and delay reset circuit 14C the output of which is connected to the input of the counter 11C. Line 17C branched from the connection terminal C is connected to another input terminal of AND gate 13C. Line 18C branched from the connection terminal F is connected to the set terminal of a flip-flop circuit 19C the output of which is connected through connection terminal G to one input terminal of the engine control circuit 10C. The reset terminal of the flip-flop circuit 19C is connected through line 20C to a point between the node H which is connected at one end to a parallel circuit of condenser 21C and resistor 22C and grounded at the other end through line 23C. The node H is connected to one end of a parallel circuit of resistor 24C and rapid discharge diode 25C, with the other end connected to one terminal of a switch 27C. The other terminal of the switch 27C is connected to the anode of a power source 28C which has its cathode grounded.

A power supply line B+ is connected to the engine control circuit 10C and flip-flop circuit 19C through line 26C.

With the above-described arrangement employing a single sensor for detection of the reference position, the pulse lack detector 8C is provided on the output side of the sensor as a circuit serving exclusively for discrimination of the nonuniformly spaced portion 4C, matching the number of projections on the rotary body 2C with the number of pulses, and initializing the count of the projections each time upon detection of the nonuniformly spaced portion 4C to discriminate the reference position periodically.

OBJECTS OF THE INVENTION

The present invention contemplates to eliminate the above-mentioned problems of the prior art, and has as its object, the provision of a rotational position detector for controlling an internal combustion engine, which is improved in adaptability to high speed rotations and which can instantly discriminate abnormalities which might exist in the results of detection.

In a conventional vehicle engine control system, part of the process is omitted when the number of the engine revolutions exceeds a predetermined speed. However, a method of this sort has a problem when a large number of projections 3C is provided on the disk 1B because the processor becomes incapable of performing the process in step with high speed rotation, in counting the projections and discriminating the reference position for counting the projections.

The present invention has been developed in view of the above-mentioned problem, and provides a device for detecting the rotational angular position of a rotating shaft for engine control, which can eliminate this particular problem by omitting part of the counting of the projections 3C and reducing the absolute amount of throughput of the processor to an extent which would not impose an adverse effect on the discrimination of the reference position.

In a conventional device illustrated in FIG. 40, measurement and arithmetic operations are carried out for each revolution of the rotary body 2C for discrimination of the nonuniformly spaced portion 4C, determining the maximum value of the time intervals between the respective pulses, which corresponds to the nonuniformly spaced portion 4C. This sort of discrimination of the nonuniformly interval 4C presents no problem as long as there are little fluctuations in the rotation of the rotary body 2C, but the discrimination of the position of the nonuniformly spaced portion 4C is rendered difficult when the pulse widths and pulse intervals are largely varied by conspicuous fluctuations in rotation.

For instance, when measuring and comparing time intervals $T_s$ between pulses of output voltage waveforms, no problem arises in determining the reference position Ps by way of a pulse position when the time $T_s$ takes a maximum value MAX for a number of pulses N as shown in FIG. 41, and the maximum value MAX appears periodically as long as the rotational speed is constant during the period of measurement. However, in a case where rotational fluctuations occur to the rotary body for some reason, a large value in the time $T_s$ occurs even at a position intermediate between the pulses of the reference position Ps as shown in FIG. 42, and in some cases a peak value MAX appears at positions other than those of the pulses of the reference position Ps, deceiving the sensor as if it is a position of the nonuniformly spaced interval 4C although the actual nonuniformly spaced portion 4C exists elsewhere. Consequently, the detection of the nonuniform interval 4C becomes difficult, inviting errors in the determination of the reference position based on the nonuniform interval 4C as well as in the control based on the detected reference position.

In view of the foregoing situations, this invention has as its technical object the provision of a device for detecting the reference position of a rotary body, which can determine the reference position correctly in spite of large rotational fluctuations.

SUMMARY OF THE INVENTION

In accordance with the present invention, the above-mentioned objects are achieved by the provision of a rotational position detector for controlling an internal combustion engine including: a rotary body rotatable in synchronism with the internal combustion engine operation. A pulse generating means is adapted to generate a pulse each time one of the detectable portions on the rotary body passes in front thereof by rotation of the rotary body. A measuring means is provided for measuring time intervals between respective pulses. An increase/decrease discriminator is adapted to compare the previous and current values of the output of the measuring means to check for an increase or decrease therein. A memory means stores the output of the increase/decrease discriminator for a predetermined period in an increase/decrease pattern and a comparator means is provided for comparing the increase/decrease pattern with a predetermined increase/decrease pattern.

In addition, in accordance with the present invention, as means for solving one of the above-mentioned problems, a device is provided for detecting rotational angular positions of a rotary shaft for engine control which includes a plural number of detectable portions provided around the circumference of a rotary body uniformly at predetermined intervals except for at least one nonuniformly spaced detectable portion. A sensor is located in a position close to the rotary body for detection of the detectable portions and a control circuit is adapted to discriminate the reference position of the rotary body on the basis of the output of the sensor and to produce an output control signal on the basis of the discriminated reference position. The control circuit is arranged to omit part of a reference position discriminating process in a high speed range of the engine revolution.

The operation which is obtained by the above-defined arrangement of the invention can reduce the absolute amount of real time processing by the control circuit in high speed rotation of the engine by omitting part of the detection process connected with discrimination of the reference position, thereby making it possible to handle, in step with the engine speed, the contents of processing to be executed within each cycle of the reference position detection, even in high speed ranges, and facilitating the engine control.

In accordance with the present invention, as means for solving one of the above-mentioned problems, a device is provided for detecting a reference position of a rotating body, which is provided with a plural number of detectable portions located around the circumference of a rotary body at uniform intervals except for at least one nonuniformly spaced detectable portion. A sensor is located in a position close to the rotary body for detection of the detectable portions. A control circuit operates on output signals of the sensor and is adapted to determine a time ratio R ($R=T_{si-1}/T_{si}$) a time length L ($L=T_{si-1}-T_{si}$) from a time interval $T_{si}$ between two output signals and a previous time interval $T_{si-1}$ to determine as the reference position a position with a larger rotation angle in terms of the time ratio R or the time length L. The control circuit counts each one of the detectable portions and discriminates a true reference position when a count corresponding to the reference position conforms with the count corresponding to a recurring reference position, producing an output signal on the basis of the discriminated true reference position.

In the above-described embodiment, for example, the position of a larger rotational angle in terms of the time ratio R or the time length L is determined by detecting a rotational angle position where the time ratio R or the time length L acquires a peak value in one period.

According to the invention with the above-described configuration, the nonuniformly spaced portion between the detectable portions of the rotary body is determined as the reference position only when it is verified by sequential and relative analysis that the detected nonuniformly spaced portion appears periodically. Therefore, even when there are large rotational fluctuations, it is possible to discriminate the reference position easily, producing output control signals appropriately on the basis of the detected reference position to control accurately the various units which are under control of the device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a diagram of increase/decrease patterns of time intervals of pulses in a normal state;

FIG. 9 is a diagram showing pulse time interval increase/decrease patterns in normal and abnormal states;

DETAILED DESCRIPTION OF THE INVENTION

Figure 1:
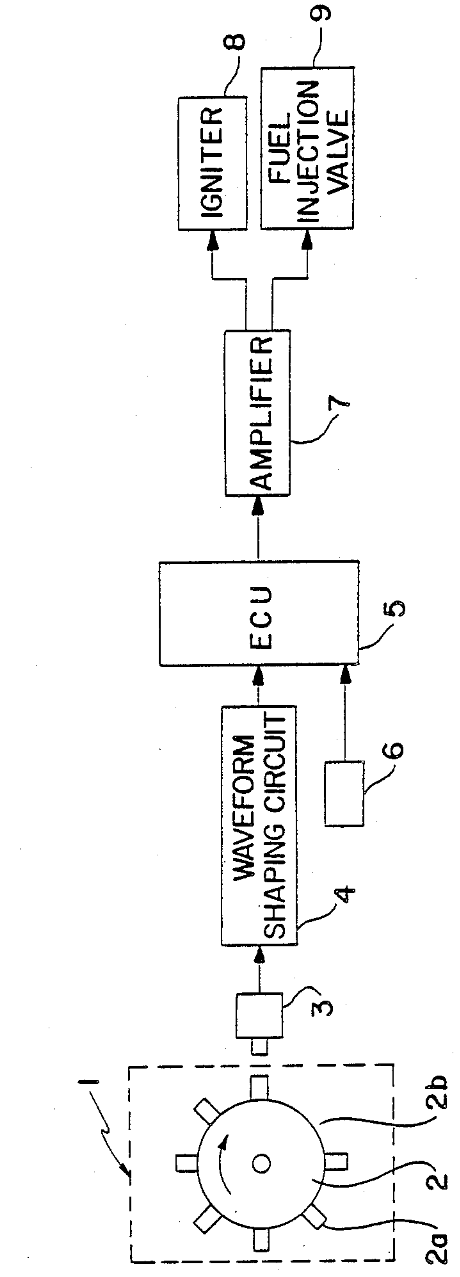
FIG. 1 is a diagrammatic illustration of the general configuration of an internal combustion engine control system incorporating a rotational position detector according to a first embodiment of the present invention.

Hereafter, the invention is described more particularly by way of preferred embodiments shown in the drawings.

FIG. 1 illustrates a general configuration of an internal combustion engine control system incorporating the rotational position detector according to the present invention. A four cylinder internal combustion engine 1 is provided with an engine crankshaft 2, a rotary body, having a number, for example, seven, radial projections, detectable portions 2*a* provided around the circumference thereof at intervals of 45 degrees except for a missing portion 2*b* where the radial projection 2*a* is omitted.

A crankshaft angular position sensor or a pulse generating means 3, hereinafter referred to simply as "PC sensor", is provided in face-to-face relation with the radial projections 2a. For example, the PC sensor 3 consists of a pickup coil for generating a crankshaft angular position signal pulse, hereinafter referred to simply as "pulse", each time a radial projection 2a passed in front thereof. The PC sensor 3 is electrically connected to an electronic control unit 5, hereinafter referred to simply as "ECU", through a waveform shaper circuit 4 to supply ECU 5 with pulses which have been shaped by the waveform shaper circuit 4.

In this embodiment, ECU 5 constitutes a measuring means, an increase/decrease discriminating means and a memory means as will be described hereinafter to detect the rotational position of the crankshaft 2 while checking whether or not the results of the detection are correct.

Further, ECU 5 is connected to various sensors 6 which detect the operating condition of the engine including the intake manifold pressure and the like to receive the output signals of these sensors. The output of the ECU 5 is connected through an amplifier circuit 7 to various engine control units such as an ignition system 8, a fuel injection valve 9 and the like. In response to input signals from various sensors 6, ECU 5 computes the control amounts of the engine controlling units such as the conduction timing of the ignition system 8, the valve open period of the fuel injection valve 9 and the like, supplying the ignition system 8 and the fuel injection valve 9 with control signals based on the results of computation with a predetermined timing according to the detected rotational position of the engine crankshaft 2, through the amplifier circuit 7.

Figures 2A, 2B:
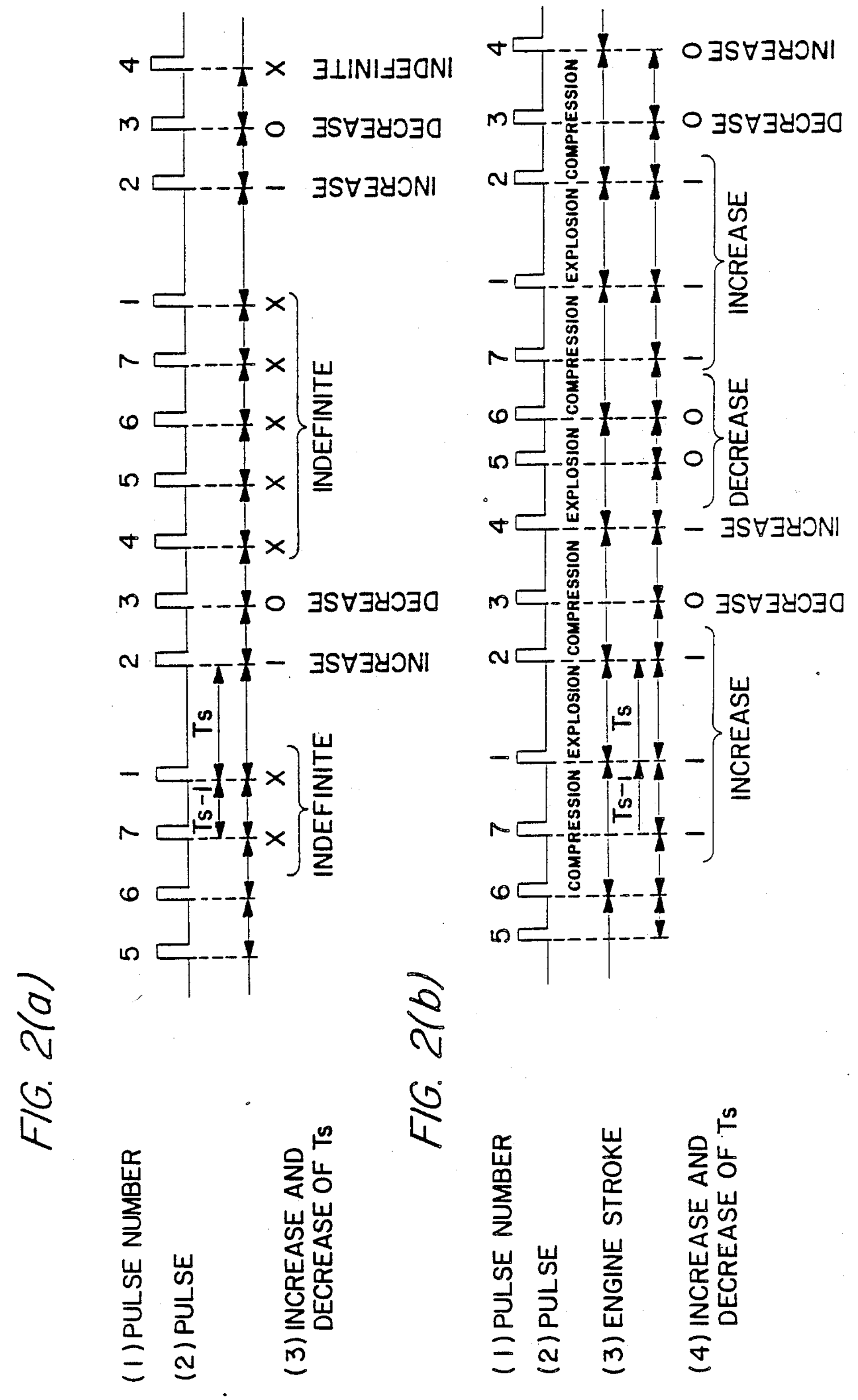
FIG. 2A and 2B are time charts showing the condition of generated crankshaft angular position signal pulses.

The rotational position detector of the above-described arrangement operates in the manner as follows. FIGS. 2A and 2B are time charts showing the condition of pulses generated by the PC sensor 3. More specifically, in this case a train of seven pulses is produced per revolution of the crankshaft 2, the time interval between the pulses corresponding to the projection missing portion 2b being greater than the time intervals between other pulses. According to the control program which will be described hereinafter, ECU 5 measures the length of the time interval $T_s$ (hereinafter referred to simply as "time interval") between a preceding pulse and a currently generated pulse, compares a current value in the time interval $T_s$ with a preceding value, setting "1" when the current value is greater than the preceding value, namely, when the time interval $T_s$ is increased, and setting "0" when the current value of $T_s$ is smaller than the preceding value.

Therefore, assuming that the crankshaft 2 is rotated clockwise in FIG. 1 and the pulses which are generated immediately before and after the passage of the projection missing portion 2b across the PC sensor 3 have values 1 and 2 in pulse number S, respectively, while the succeeding pulses having values 3 to 7, respectively, the time interval between the pulses 1 and 2 in the pulse number S is longer than other time intervals of uniform lengths as shown in FIG. 2A if the crankshaft 2 is rotated at a constant speed. Therefore, ECU 5 sets a value "1" for the increase of the time interval at the pulse number $S=2$ and sets a value "0" for the decrease of the time interval at the pulse number $S=3$, judging as "indefinite" at other values of the pulse number S.

On the other hand, during operation of the engine 1, the load which is imposed on the crankshaft 2 increases at the end of the compression stroke as shown in FIG. 2B to cause rotational fluctuations to the crankshaft 2. For example, although the ends of the compression strokes normally correspond to the occurrences of the pulses at the pulse numbers $S=1$ and 4, the rotational fluctuation causes ECU 5 to form a time interval $T_s$ increase/decrease pattern, hereinafter referred to simply as "increase/decrease pattern", of 1 (increase), 1, 0 (decrease), 1, 0, 0 and 1 for the pulses of the pulse numbers $S=1$ to 7.

Namely, the time intervals $T_s$ between the respective pulses are in a predetermined increase/decrease pattern during operation of the engine, so that, if such patterns are stored in memory beforehand, it is possible to detect the pulse numbers of generated pulses, that is to say, the rotational position of the crankshaft 2 as well as a deviation of the pulse count as caused by a noise or arising from the operation of the PC sensor, in other words, an abnormality if the results of detection of the rotational position, by comparing a detected increase/decrease pattern with the predetermined patterns. FIG. 3 shows increase/decrease patterns corresponding to the respective pulse numbers in a case where the generated pulses are counted correctly free of noises, namely, in a case where the pulses from the PC sensor 3 are correctly counted by the ECU 5.

Explained hereunder are the contents of the control programs which are executed by the ECU 5.

Figure 4:
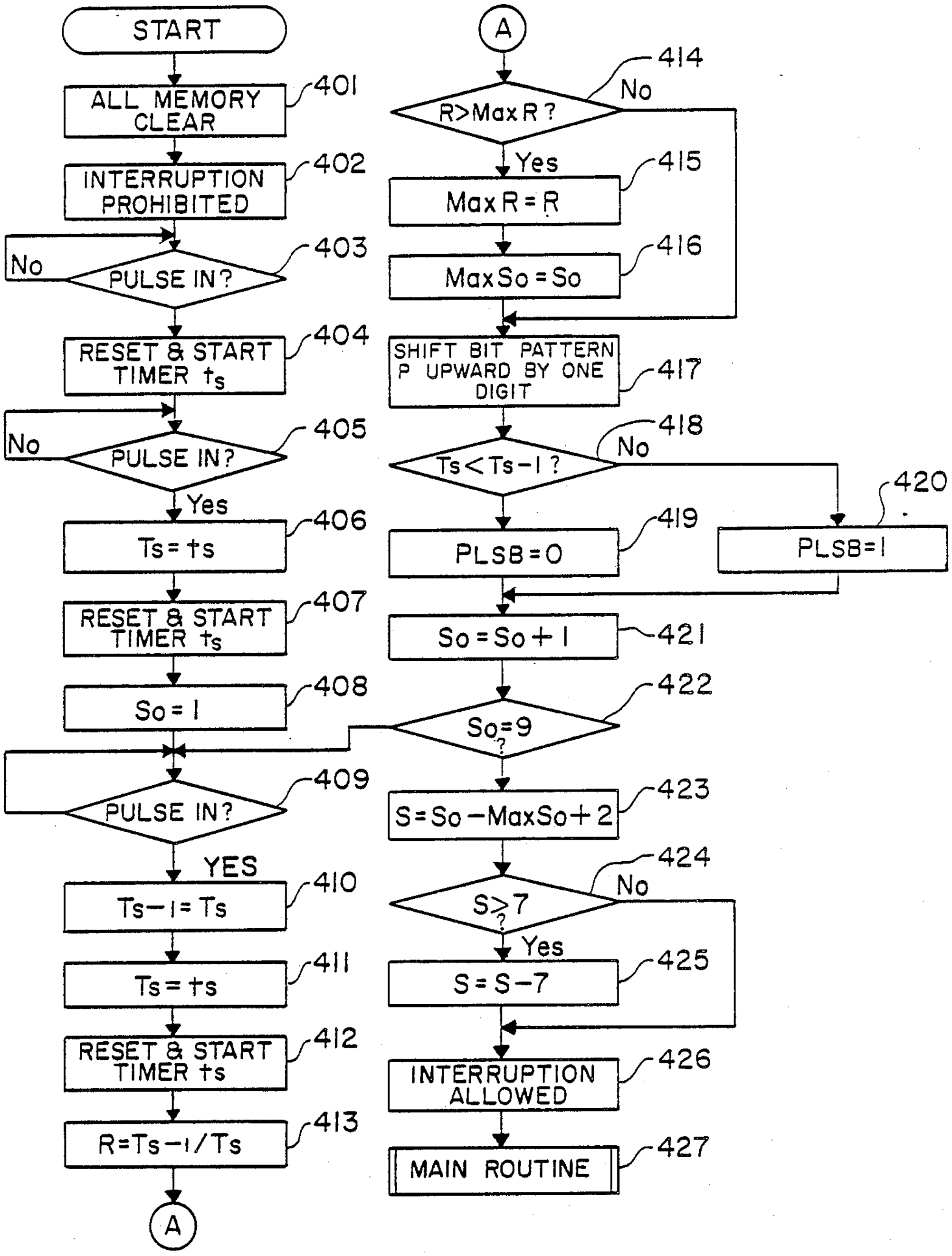
FIG. 4 is a flowchart of a subroutine for initializing the pulse number S and pulse time interval increase/decrease pattern.

Referring to FIG. 4, there is shown a flowchart of a routine for initializing the aforementioned pulse number and increase/decrease pattern. This routine is executed at a start of the engine 1 or when an abnormal pulse count is discriminated by the subroutine of FIG. 6 which will be described hereinafter.

At Step 401, the contents of the memory including the bit patterns, which will be described hereinafter, are all cleared, inhibiting interruption of the subroutine of FIG. 5 which will also be described hereinafter (Step 402).

Next, a check is made to see if an input pulse has been received (Step 403), and, if the answer is affirmative or a pulse has been received (yes), a ts timer which is built in the ECU 5 and which consists of an upcounter is reset and started (Step 404). Then, similarly to Step 403, a check is made to see if an input pulse has been received (Step 405), and, if affirmative, the count ts of the ts counter is set to the value of the time interval $T_s$ from the occurrence of the input pulse at Step 403 (Step 406), resetting and starting the ts timer similarly to Step 404, and setting a temporary pulse number So to 1 (Step 408).

Next, a check is made to see if an input pulse has been received (Step 409), and, if affirmative, the time interval $T_s$ set at Step 406 is reset to a previous value $T_{s-1}$ (Step 410). After setting the count ts of the ts counter ts to a current count $T_s$ of a new time interval (Step 411), the ts timer is reset and started (Step 412).

At the next Step 413, a ratio R of the preceding and current values $T_{s-1}$ and $T_s$ of the time interval is computed, and a check is made to see if the computed ratio R is greater than the maximum value MaxR so far obtained (Step 414). If the answer is affirmative (yes), namely, when $R>MaxR$, the value of R at this time is placed in MaxR, and the temporary pulse number So is reset to MaxSo (Steps 415 and 416), then advancing to the next Step 417. Namely, the maximum value MaxR indicates the maximum value of R while MaxSo indicates a temporary pulse number So at that time. If the answer at Step 414 is negative or when R<MaxR, the sequence advances to Step 417.

At Step 417, the bit patterns P stored in the ECU 5 are shifted up by one digit, and a check is made to see if the current value $T_s$ of the time interval is smaller than the previous value $T_{s-1}$ (Step 418). If the answer is affirmative (yes) or when $T_s<T_{s-1}$, that is to say, when the current value $T_s$ of the time interval is smaller than the previous value $T_{s-1}$, the value of least significant bit PLSB is set to 1 (Step 420).

In the next place, a value of 1 is added to the temporary pulse number So at Step 421, checking at Step 422 to see if the temporary pulse number has reached a value of 9 after the addition, advancing to Step 409 if the answer is negative (no). Namely, Steps 409 to 421 are repeated until the temporary pulse number So reaches the value of 9, setting the values of MaxR, MaxSo, bit pattern P and pulse number So.

If the answer at Step 422 is affirmative (yes) or when the pulse number So reaches the value of 9, the pulse number S is computed as S=So−MaxSo+2 (Step 423). As clear from FIG. 2B, the maximum value MaxR is set by execution of Step 415 on occurrence of a pulse corresponding to the pulse number S=3. However, since the addition of the pulse number So (Step 421) corresponding to the occurrence of that pulse is effected after the renewal of MaxSo, the pulse number S can be correctly allotted to a generated pulse by converting the pulse number So to the setting pulse number S by the equation given above.

Advancing to Step 424, a check is made to see if the pulse number S at Step 423 is greater than a value of 7. If the answer is affirmative (yes), 7 is subtracted from the value S to reset the pulse number S to a value smaller than 7 (Step 425). If the answer is negative (no), the sequence advances directly to Step 426.

Figure 5:
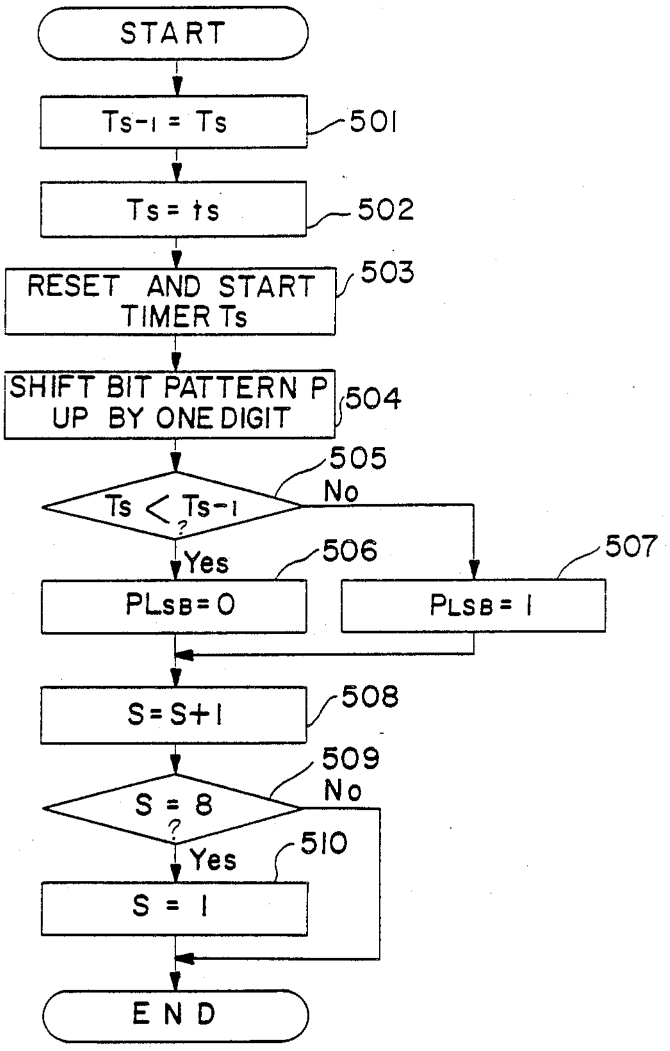
FIG. 5 is a flowchart of a subroutine for renewing the pulse number S and pulse time interval increase/decrease pattern.
Figure 6:
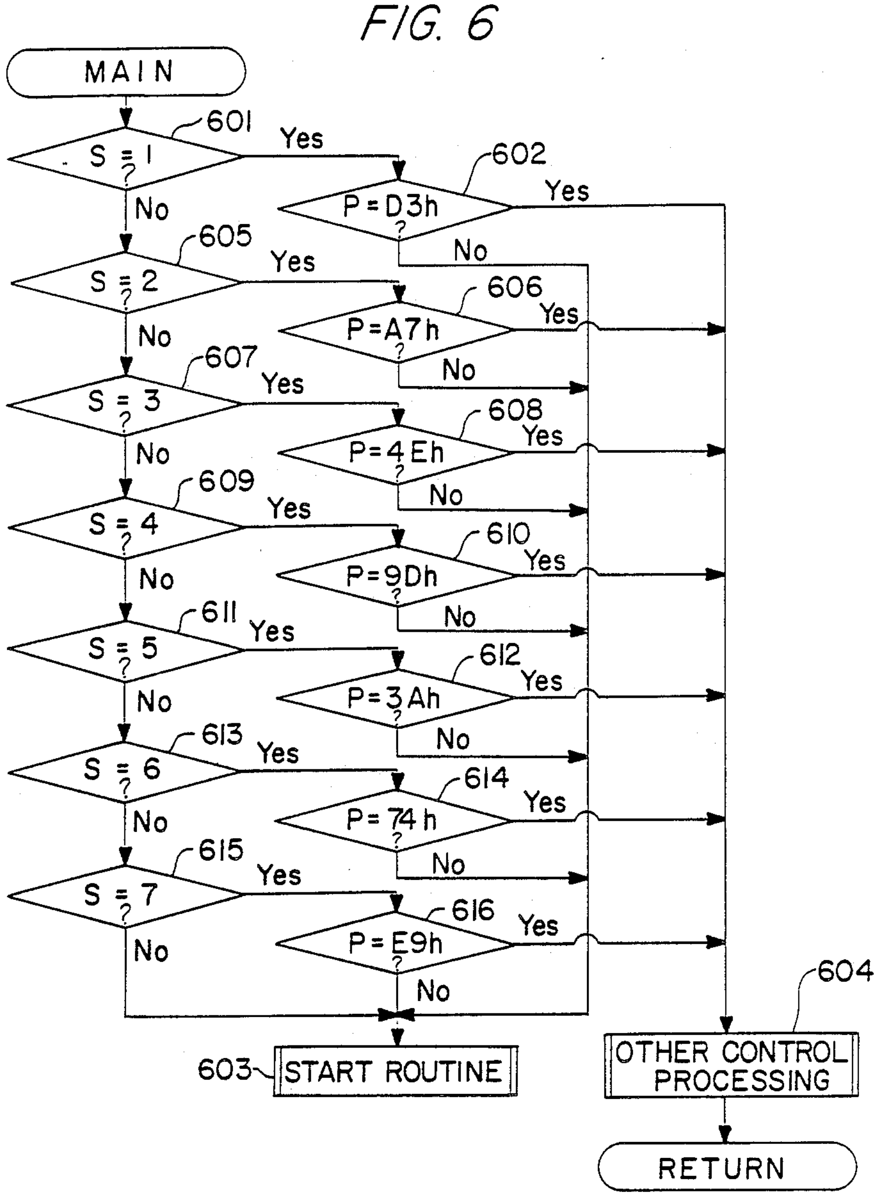
FIG. 6 is a flowchart of a subroutine for checking for abnormality of the pulse count.

At Step 426, the inhibition of interruption set at Step 402 is cancelled to make the subroutine of FIG. 5 interruptible, and then the subroutine of FIG. 6 is continuously executed (Step 427) to complete this program. By the above-described execution of this program, predetermined pulse numbers and increase/decrease patterns are allotted to the generated pulses on starting the engine 1 or upon detection of an abnormality in the pulse count.

Referring to FIG. 5, there is illustrated a flowchart of a control subroutine for renewing the pulse number S and increase/decrease pattern. This program is executed in synchronism with the generated pulses and by interruption of the subroutine of FIG. 6 which will be described hereinafter.

First, similarly to Steps 410 and 412 of the above-described subroutine of FIG. 4, the previous value $T_{s-1}$ and the current value $T_s$ of the time interval are set, resetting and starting the ts timer (Steps 501 to 503), and shifting up the bit pattern P by one digit (Step 504).

Next, a check is made to see if the current value $T_s$ of the time interval set at Step 502 is smaller than the previous value $T_{s-1}$ (Step 505). If $T_s<T_{s-1}$ the least significant bit $P_{LSB}$ of the bit pattern P is set to 0, and, if $T_s>T_{s-1}$, the value $P_{LSB}$ is set to 1 (Steps 506 and 507), renewing the increase/decrease pattern P.

After this, 1 is added to the pulse number S for renewal (Step 508), and a check is made to see if the renewed pulse number S has reached 8 (Step 509). If S=8, the pulse number S is reset to 1 (Step 510) to effect ring counting between 1 and 7, and then this program is ended.

Referring to FIG. 6, there is illustrated a flowchart of a subroutine for detecting an abnormality in the pulse count. This program is executed continuously after the subroutine of FIG. 4, for example, executed repeatedly at certain time intervals.

More specifically, this program checks for the correctness of the pulse count by comparing the increase/decrease pattern obtained by the subroutine of FIGS. 4 or 5 to see if it conforms with a predetermined increase/decrease pattern (see FIG. 3) which would be obtained by correct counting of each pulse number S. In this particular embodiment, the lower eight digits of the bit pattern P, namely, eight fresh pulses are compared after conversion into a hexadecimal number.

First, at Step 601, the pulse number S is checked to see if it is equal to 1. If the answer is affirmative (yes) or when S=1, Step 602 checks if an equation P=D3h is established, since the bit pattern for the correct pulse counting is P=D3h as clear from FIG. 3. If the answer to this is negative (no) or when the equation P=D3h is not established, namely, when the increase/decrease pattern of the detected time intervals $T_s$ does not conform with the predetermined pattern, the count of the pulse number S is held as incorrect, and the sequence advances to Step 603, executing the above-described subroutine of FIG. 4 to initialize the pulse number S and the increase/decrease pattern again.

On the other hand, when the answer at Step 602 is affirmative (yes) or when P=D3h, indicating that the detected increase/decrease pattern conforms with a predetermined pattern by correct counting of the pulse number S, the sequence advances to Step 604 to produce an output control signal for the ignition system 8 and the fuel injection valve 9 according to the detected pulse number S and with a predetermined timing, then ending this program.

Thereafter, similarly the pulse number S is discriminated and the detected increase/decrease pattern is compared with a predetermined increase/decrease pattern corresponding to the discriminated pulse number S, executing Step 603 or 604 according to the results of comparison. More specifically, a check is made to see if P=A7h when S=2 (Steps 605 and 606), P=4Eh when S=3 (Steps 607 and 608), P=9DH when S=4 (Steps 609 and 610), P=3Ah when S=5 (Steps 611 and 612), P=74h when S=6 (Steps 613 and 614), and P=E9h when S=7 (Steps 615 and 616), executing Step 603 if the answer is negative (no), and executing Step 604 if the answer is affirmative (yes).

When the answer is negative (no) at Step 615, namely, when the pulse number is other than a value of from 1 to 7, Step 603 is executed regarding that the pulse number S is set incorrectly.

As will be understood from the foregoing description, according to the present invention, the count of the pulse number and the renewal of the increase/decrease pattern are effected upon generation of each pulse, checking for an abnormality in the pulse count on the basis of the obtained pulse number and increase/decrease pattern. It follows that a check for an abnormality is made on the occurrence of each pulse to discriminate instantly an abnormality in the results of detection of the rotational position if any. In addition to an advantage that there is no need for producing reference pulses, abnormalities can be detected by comparison of the increase/decrease patterns which require only simple computations, so that it becomes possible to shorten the time for arithmetic operations, improving the high speed adaptability of the rotational position detection and instantly distinguishing abnormalities in the results of detection if any.

Figure 7:
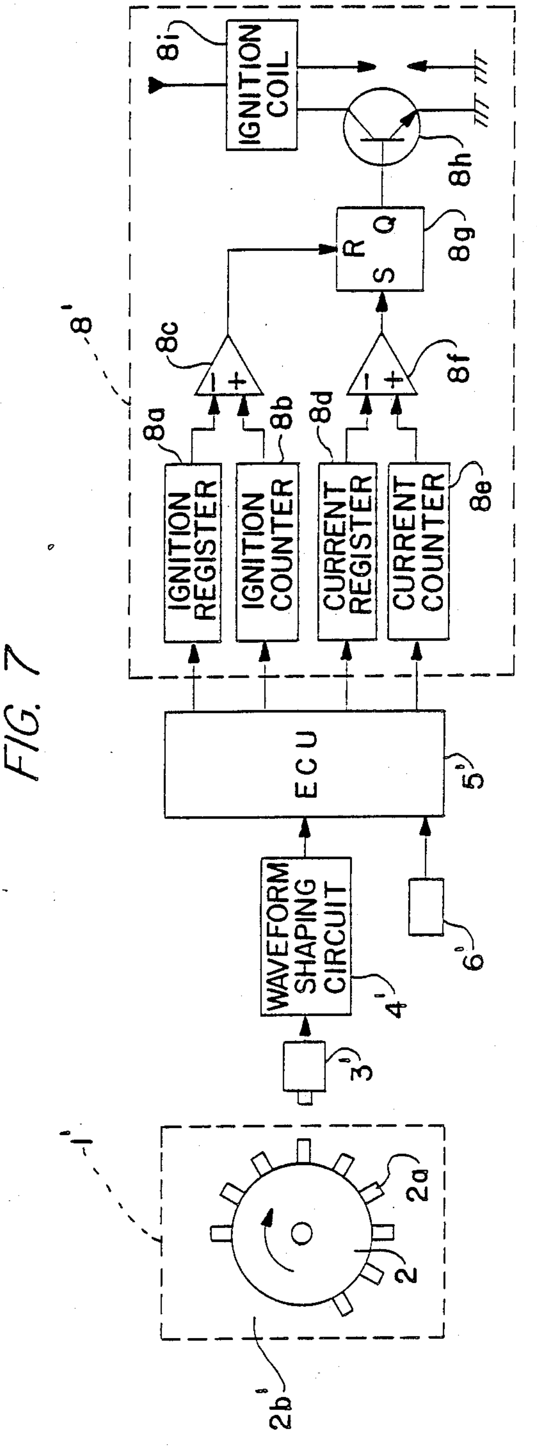
FIG. 7 is a diagrammatic illustration of the general configuration of an ignition timing control system for an internal combustion engine, incorporating a rotational position detector according to a second embodiment of the present invention.

FIG. 7 illustrates the general configuration of an ignition time control system of an internal combustion engine, employing a second embodiment of the rotational position detector according to the present invention. The rotational position detector of this embodiment mainly differs from the above-described first embodiment in the number and length of the intervals of the projections 2a' on the engine crankshaft 2' and in that the ECU 5' is arranged to measure the time interval of the generated pulses and discriminate with respect to an increase or decrease in the time interval on occurrence of a pulse of a particular pulse number instead of on occurrence of each pulse.

More specifically, radial projections 2a', for example, nine projections 2a' are provided around the circumference of the engine crankshaft 2' uniformly at intervals of 30 degrees except for a projection missing portion 2b' where three projections are omitted. ECU 5' is arranged in the same manner as in the first embodiment, and connected to the PC sensor 3' through a waveform shaper circuit 4' in addition to various sensors 6'.

In response to the input pulses from the PC sensor 3', ECU 5' detects the rotational positions of the crankshaft 2' and checks for the correctness of the results of detection by the method which will be described hereinafter. Further, in response to input signals from various sensors 6', the ECU 5' computes the control amounts such as the ignition timing and conduction timing of the ignition system 8', operates an ignition counter and a current counter according to the detected rotational positions, thereby operating the ignition system 8' with predetermined timing.

The ECU 5' is connected to ignition register 8a and ignition counter 8b of the ignition system 8', the ignition register 8a serves to set the ignition timing computed by the ECU 5'. The ignition counter 8b consists of an up-counter which starts to operate with a predetermined timing under control of the ECU 5'. Both of the ignition register 8a and ignition counter 8b are connected to the input of a first comparator 8c which produces a high level signal when the count of the ignition counter 8b exceeds the ignition timing set in the ignition register 8a.

Further, a current register 8d of a construction similar to the ignition register 8a, a current counter 8e and a second comparator circuit 8f are provided in the ignition system 8. More specifically, the current register 8d serves to set the computed current timing, the current counter 8e starts its operation with predetermined timing under control of the ECU 5, and the second comparator circuit 8e produces a high level signal when the count of the current counter exceeds the above-mentioned current timing.

The outputs of the first and second comparators 8c and 8f are connected to the reset and set terminals R and S of an R-S type flip-flop circuit 8g, respectively. The Q output terminal of the R-S type flip-flop circuit 8g is connected to an ignition coil 8i through a transistor $8_h$. Namely, the Q output turns to high level when a high level signal is produced only at the output of the second comparator circuit 8f, supplying energizing current to the ignition coil 8i, and turns to low level when a high level signal appears also at the output of the first comparator circuit 8c to effect the ignition.

The rotational position detector with the above-described arrangement operates in the following manner. Referring to FIG. 8A, a time chart illustrates the condition of generated pulses. In this case, a pulse train consisting of nine pulses is generated per revolution of the engine crankshaft 2', the time interval between the pulses corresponding to the projection missing portion 2b' having a length which is four times longer than the time intervals between other pulses.

Instead of measuring the time interval $T_s$ between two adjacent pulses upon occurrences of each pulse, the ECU 5' measures the time interval $T_s$ between the pulses of the pulse numbers S detected by the control program which will be described hereinafter.

More specifically, assuming that the crankshaft 2' is rotated clockwise in FIG. 7 and that the pulses which are generated immediately before and after the passage of the projection missing portion 2b' in front of the PC sensor 3' have values of 1 and 2 in the pulse number S, respectively, while the succeeding pulses have values of 3 to 9, respectively, the ECU 5' counts the pulses upon occurrence of each pulse but measures the time interval $T_s$ only between the pulse numbers S=1 and 2, 2 and 4, 4 and 8, and 8 and 1. Hereafter, the time intervals between these pulses are respectively defined as $T_{s1}$ to $T_{s4}$. Accordingly, when the pulses are counted correctly, a predetermined increase/decrease pattern of increase (1), decrease (0), increase (1), decrease (0) and increase (1) as shown in FIG. 8B by measuring the time intervals $T_{s1}$, $T_{s2}$, $T_{s3}$, $T_{s4}$, $T_{s1}$ and so forth.

Figure 8:
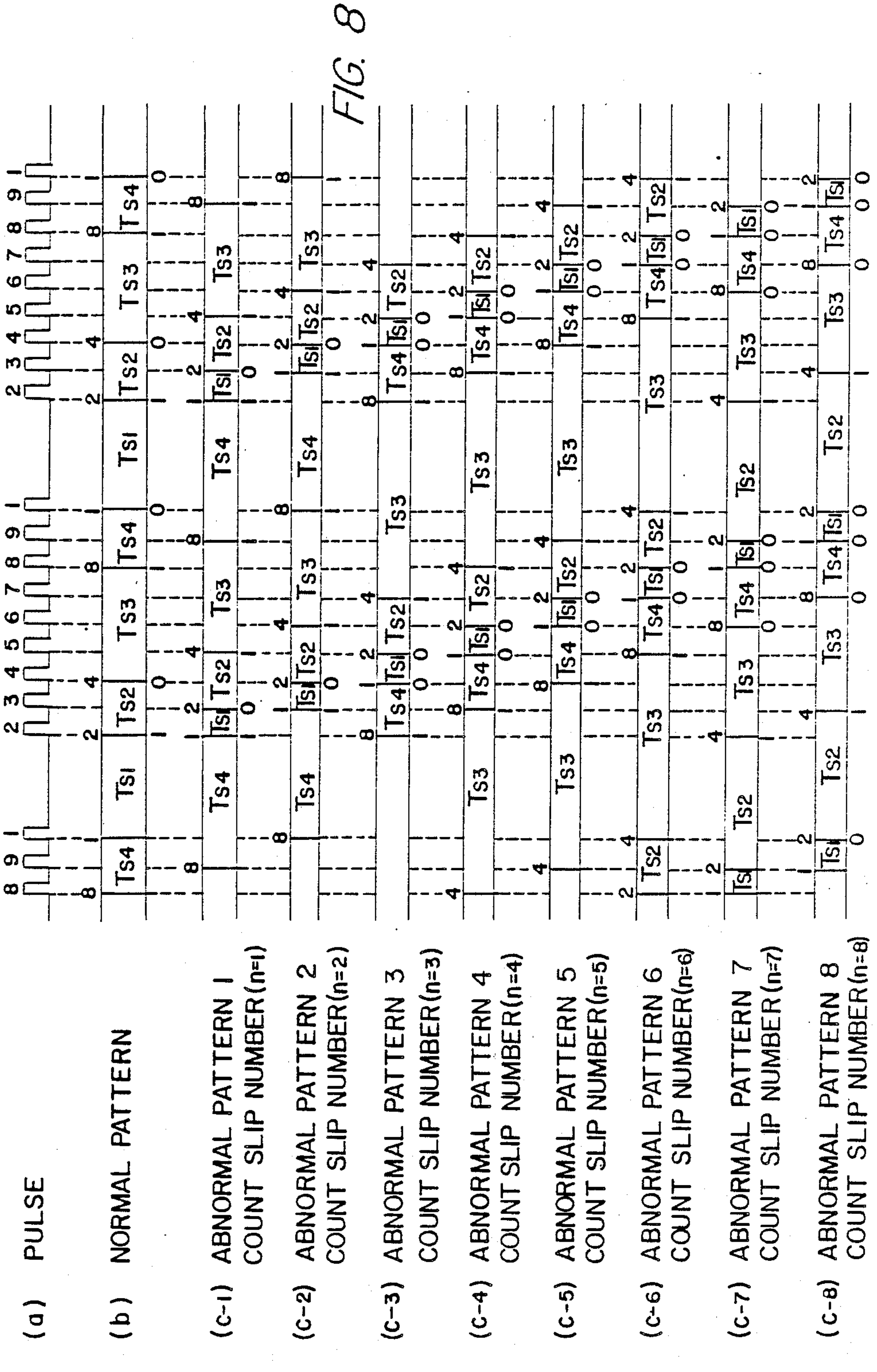
FIG. 8 is a time chart showing the conditions of pulse counts in normal and abnormal states.

On the other hand, a deviation occurs to the count in a case where the count is once deviated by a noise or the like and then the counting is resumed to increase the count on occurrence of each pulse, resulting in an increase/decrease pattern which is affected by the count deviation and which belongs to one of the abnormal patterns shown at (C-1) to (C-8) of FIG. 8. For example, when a single noise is counted as a pulse, the pulse number S is detected with a lag of 1 (with a number of count deviation n=1) as shown at (C-1) of the same figure, forming in an increase/decrease pattern of 0, 1, 1, 1 by measurement of the time intervals $T_{s1}$, $T_{s2}$, $T_{s3}$ and $T_{s4}$.

Similar, FIG. 9 shows a tabulated form of the increase/decrease patterns in relation with the number of count deviation n. As seen in FIG. 9, it is only when the count is correct that the increase/decrease pattern of 1, 0, 1, 0 is obtained by measurement of the time intervals $T_{s1}$, $T_{s2}$, $T_{s3}$ and $T_{s4}$. Therefore, it is possible to check for the correctness of the pulse count by comparing this predetermined increase/decrease pattern with a detected pattern.

Hereafter, the contents of the control programs executed by the ECU 5' are explained.

Figure 10:
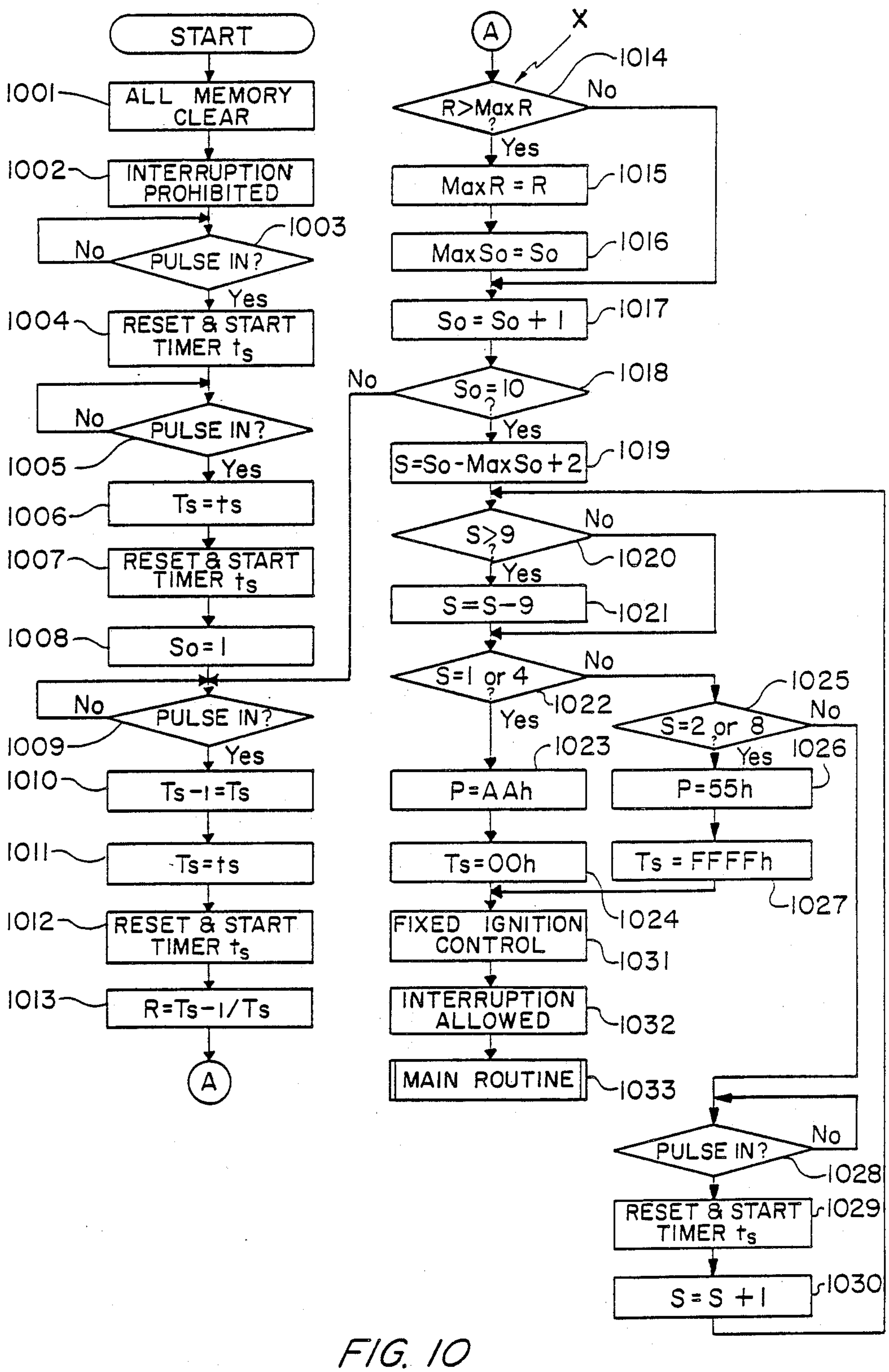
FIG. 10 is a flowchart for initializing the pulse number S and pulse time interval increase/decrease pattern.

FIG. 10 illustrates a flowchart of a subroutine for initializing the pulse number S and the increase/decrease pattern, which is executed in a similar situation as the subroutine of FIG. 4.

First, Steps 1001 to 1016 effect exactly the same execution as Steps 401 to 416 of the subroutine of FIG. 4. Then, at Step 1017, 1 is added to the temporary pulse number So, and at Step 1018 a check is made to see if the temporary pulse number So has reached a value of 10 after the addition. If the answer is negative (no), the sequence advances to the aforementioned Step 1009, and if affirmative (yes) the pulse number S is computed as S=So−MaxSo+2 (Step 1019).

Next, a check is made to see if the pulse number S set at Step 1019 is larger than a value 9 (Step 1020). If the answer is affirmative (yes), a value of 9 is subtracted from the pulse number S (Step 1021), and if negative (no), the sequence advances directly to Step 1022.

At Step 1022, a check is made to see if the pulse number S is equal to either 1 or 4 If the answer is affirmative (yes) or when S=1 or 4, the time interval $T_s$ is renewed to $T_{s4}$ or $T_{s2}$ as shown in FIG. 8. Since the bit pattern P is always 1, 0, 1, 0 (see FIG. 9) if the count is correct, the eight digits of the pulse count are converted into a hexadecimal number and set as P=AAh (Step 1023), thereafter setting the time interval $T_s$ to a minimum settable value 00h (Step 1024) before advancing to Step 1031.

If the answer at Step 1022 is negative (no), a check is made to see if the pulse number S is equal to a value 2 or 8 (Step 1025). If the answer to this is affirmative (yes), namely, when S=2 or 8, the time interval $T_s$ is renewed to $T_{s1}$ or $T_{s3}$. Since in any case the bit pattern P of correct pulse count is 0, 1, 0, 1, it is set to P=55h (Step 1026), and the time interval $T_s$ is set to a maximum settable value FFFFh (Step 1027), then advancing to Step 1031 which will be described hereinafter.

If the answer at Step 1025 is negative (no), namely, when the pulse number S is other than a value 1, 2, 4 or 8, a check is made to see if an input pulse has been received (Step 1028). When an input pulse has been received, the ts timer is set and started (Step 1029), and then 1 is added to the pulse number S (Step 1030), thereafter advancing to the aforementioned step 1020.

Figure 11:
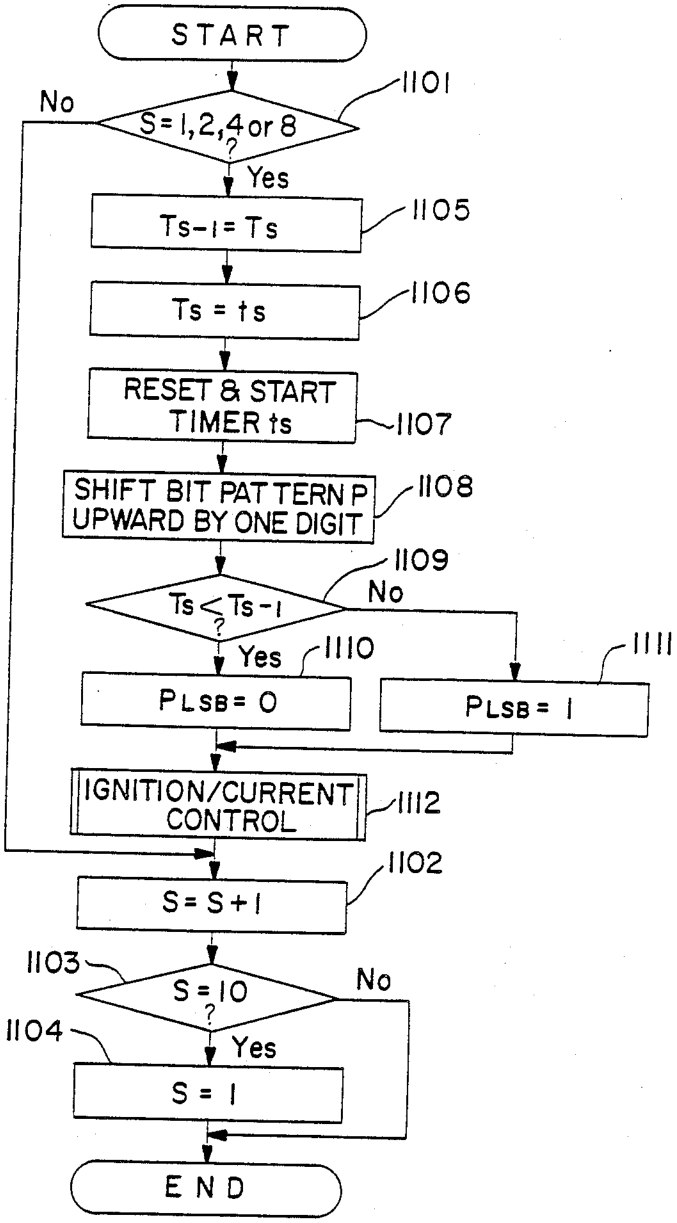
FIG. 11 is a flowchart of a subroutine for renewing the pulse number S and pulse time interval increase/decrease pattern.

Step 1031 effects a fixed ignition control, namely, an ignition control irrespective of the input signals from various sensors 6, and then the inhibition of interruption of the subroutine of FIG. 11 is cancelled (Step 1032), succeedingly executing the subroutine of FIG. 12 (Step 1033) which will be described hereinafter, before ending this program.

FIG. 11 illustrates a flowchart of a subroutine which is executed in synchronism with generated pulses similarly to the subroutine of FIG. 5, for controlling the renewal of the pulse number and increase/decrease pattern and for controlling the ignition and current timings.

First, at Step 1101, a check is made to see if the pulse number S is equal to a value of 1, 2, 4 or 8. If the answer to this is negative (no), the sequence advances to Step 1102 regarding the pulse number S not having a value corresponding to the renewal of the increase/decrease pattern. At Step 1102, 1 is added to the pulse number S, and Step 1103 makes a check to see if the pulse number S has reached a value of 10 after the addition. If the answer is affirmative (yes), the pulse number is reset to 1 (Step 1104), and, if negative (no), this program is ended at that step. Namely, only the pulse counting is effected when the pulse number S has a value other than 1, 2, 4 and 8.

If the answer is affirmative (yes) at Step 1101, namely, when the pulse number is equal to any one of the values 1, 2, 4 and 8, Steps 1105 and 1111 perform the executions same as Steps 501 and 507, measuring the time interval $T_s$ and comparing same with a previous value $T_{s-1}$, and renewing the increase/decrease pattern according to the results of comparison.

Next, Step 1112 carries out the ignition and current control, namely, discriminates the pulse number S and starts the ignition counter 8*c* and the current counter 8*f* with predetermined timing according to the results of discrimination. Then, Steps 1102 and 1104 are executed before ending this program.

Figure 12:
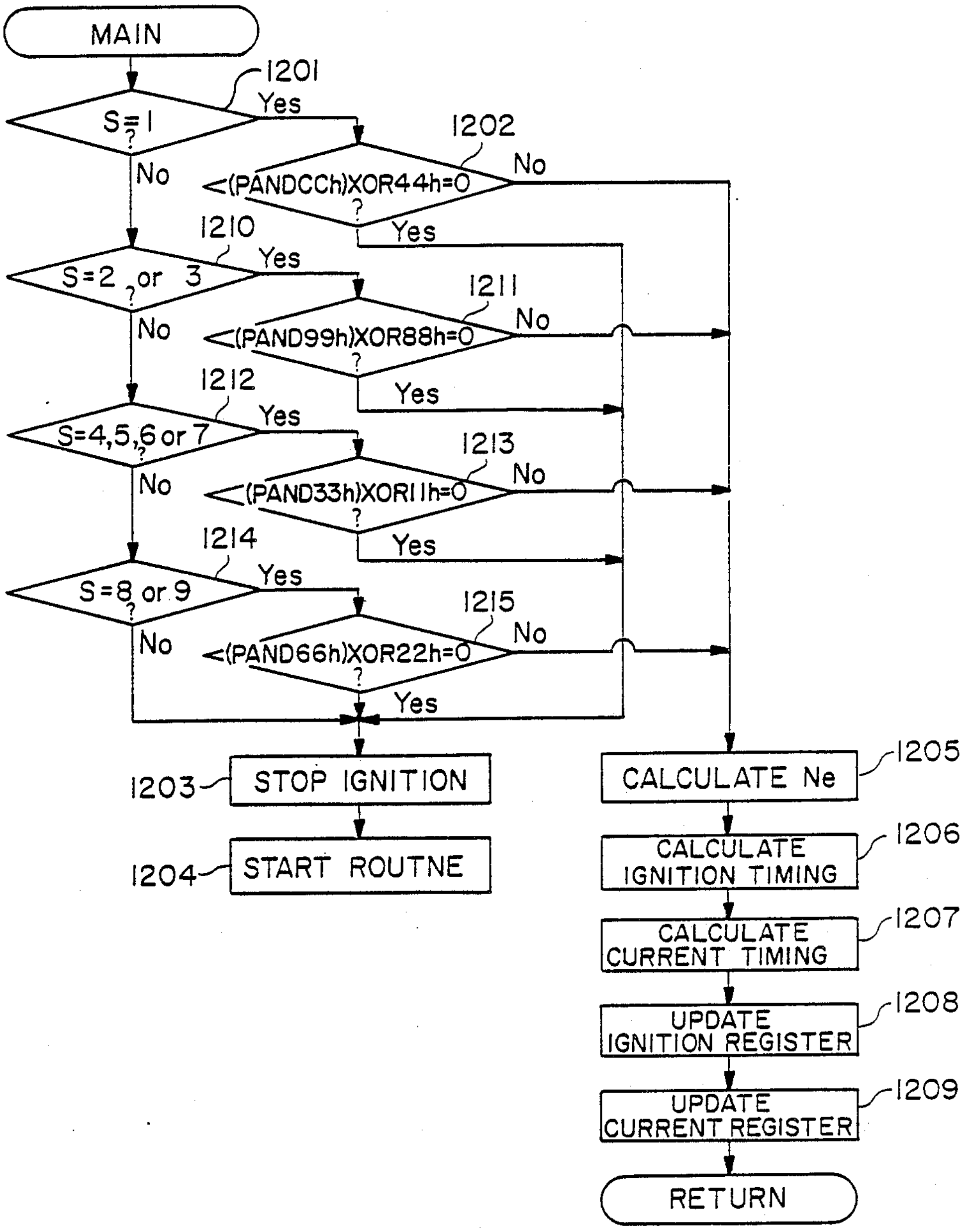
FIG. 12 is a flowchart of a subroutine for checking for abnormality of the pulse count.

Referring to FIG. 12, a flowchart of a subroutine is illustrated which is executed in a situation similar to the subroutine of FIG. 6, for checking for any abnormality in the pulse count and for computing the ignition and current timings.

More specifically, this program discriminates an abnormality through computations which are performed for comparing a detected increase/decrease pattern with the predetermined pattern corresponding to the pulse number S at the time of the detection. In this embodiment, when the count is abnormal, the values which are obtained by measurement of the time intervals $T_{s1}$ and $T_{s2}$ are "0" and "1" irrespective of the number of count deviation n (see FIG. 9), so that the abnormality of the count is discriminated by arithmetic operations basically including, for example, ANDing the renewed bit pattern P (4-digit) with the bit pattern 1100 and then exclusive ORing with the bit pattern 0100, and determining the count as abnormal if the results of the ANDing and ORing operations is equal to a bit pattern 0000 as expressed by the following Equation (1).

(P AND 1100) XOR 0100=000 . . . (1)

The foregoing Equation (1) corresponds to the measurement of the time interval $T_{s4}$, and for application to the measurement of other time intervals $T_s$ the bit patterns 1100 and 0100 are shifted according to the position of the detected time interval $T_s$. In an actual program, eight digits converted into hexadecimal numbers are incorporated into Equation (1).

First, at Step 1201, a check is made to see if the pulse number S is equal to a value 1. If the answer is affirmative (yes), it means that the time interval has been renewed to $T_{s4}$, and therefore Step 1202 checks if (PANDCCh) XOR44h=0. If the answer is affirmative (yes), that is to say, when the above-defined equation is established, the pulse count is regarded as abnormal and the ignition is stopped (Step 1203), followed by execution of the subroutine of FIG. 10 (Step 1204). On the other hand, when the answer at Step 1202 is negative (no), namely, when the above-defined equation is not established, the count is regarded as correct and computations of the ignition and conduction timing are carried out at Step 1205 and the following steps.

More particularly, at Step 1205 the engine speed Ne is computed on the basis of the measured time interval $T_s$, and the ignition and conduction timings are computed according to the computed engine speed Ne and the engine parameter signals from the various sensors 6 (Steps 1206 and 1207), setting the computed ignition and conduction timings respectively in the ignition register 8*a* and conduction register 8*d* (Steps 1208 and 1209) to end this program.

Similarly, when the pulse number S=2 or 3, the time interval has been renewed to $T_{s1}$, so that a check is made to see if (PAND99h) XOR88h=0 is established (Steps 1210 and 1222), checking if (PAND33h) XOR11h=0 is established (Steps 1210 and 1222), checking if (PAND33h) XOR11h=0 is established when S=4, 5, 6, or 7 (Steps 1212 and 1213) and checking if (PAND66h) XOR22h=0 is established when S=8 or 9 (Steps 1214 and 1215). If the answer is affirmative (yes) at these steps, Step 1203 and the succeeding steps are executed. If the answer is negative (no), Step 1205 and the succeeding steps are executed. If the answer is affirmative at Step 1214, Step 1203 and the succeeding steps are executed.

As clear from the foregoing description, in this embodiment, the pulse number is counted on occurrence of each pulse, and the increase/decrease pattern is executed on occurrence of pulses corresponding to predetermined pulse numbers, discriminating an incorrect or abnormal pulse count on the basis of the obtained pulse number and increase/decrease pattern. Therefore, a check for the correctness of the pulse count is made on the occurrences of the predetermined pulses, improving the adaptability of the rotational position detection to high speed rotations similarly to the first embodiment while promptly discriminating abnormalities in the results of detection. Besides, the measurement of the time interval $T_s$ and the renewal of the increase/decrease pattern are executed on occurrences of certain predetermined pulses, thereby reducing the frequency and simplifying the required arithmetic operations.

The predetermined pulses selected as reference for executing the above-described operations including the measurement of the time interval $T_s$ are not restricted to the particular example given in the foregoing embodiment, and their frequency may be increased suitably, for example, in connection with the rotational positions where close control is required. In such a case, the increment/decrement patterns are preset according to the frequency settings. Further, the arithmetic operation for comparing a detected increase/decrease pattern with a predetermined reference pattern is not restricted to the particular formula of logic operation employed in the foregoing embodiment, and may be performed on the basis of other logic and arithmetic formulas and in various ways according to the functions of the logic and arithmetic unit in the ECU 5.

It will be appreciated from the foregoing description that, according to the present invention, the increases and decreases in the time intervals between pulses of pulse trains, which are generated by rotation of a rotary body in synchronism with operation of an internal combustion engine, are stored in memory as an increase/decrease pattern for comparison with a predetermined reference pattern. Therefore, it becomes possible to detect the rotational position and to check for an abnormality in the result of detection on the occurrence of a pulse of a predetermined position, enhancing the adaptability to high speeds of the rotational position detecting operation and at the same time permitting to discriminate instantly an abnormality in the result of detection, if any, for improving the accuracy of engine control.

Hereafter, the invention is described more particularly by way of preferred embodiments with reference to FIGS. 13–22.

Figure 13:
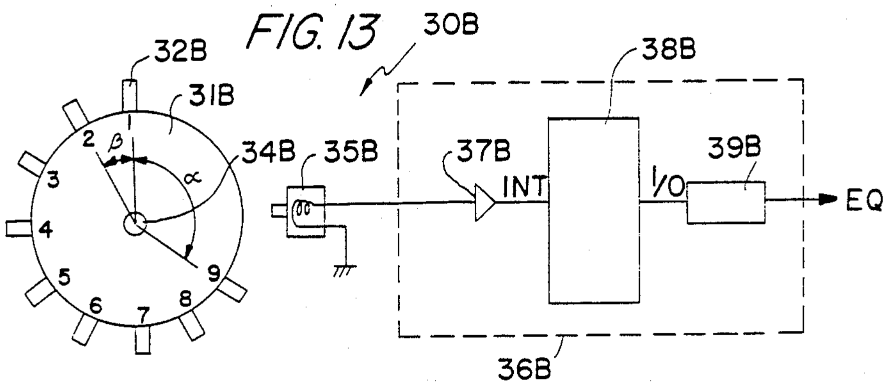
FIG. 13 is a diagrammatic illustration of a rotational angular position detector for an engine controlling rotational shaft.

As shown by way of example in FIG. 13, the reference position detector 30B includes a plural number of rectangular projections which protrude from the circumference of a rotary body 31B to form detectable portions 32B, and a sensor 35B located adjacent to the circumference of the rotary body 31B to detect presence or absence of the detectable portions 32B as the rotary body 31B is rotated about a shaft 34B.

One of the terminal ends of the sensor 35B is grounded while connecting the other end to a control circuit 36B, which includes a waveform shaper circuit connected to the sensor 35B, a central processing unit (hereinafter referred to as "CPU" for brevity) 38B includes an interrupt terminal connected to the output terminal of the shaper circuit 37B, and an amplifier circuit 39B having its input terminal connected to an output terminal of the CPU 38B.

The output of the control circuit 36B, namely, the output of the amplifier circuit 39B is connected to a fuel injection system, ignition system, engine control unit or other equipments EQ to be controlled by the control signals from the control circuit 36B.

The positions and the number of the detectable portions 32B on the rotary body 31B are determined to satisfy the following condition $$\alpha=(n=1)\beta \ldots \quad (1)$$

where $\alpha$ is the center angle between detectable portions in a nonuniformly spaced portion, $\beta$ is the center angle between detectable portions in a uniformly spaced portion, and n is a consecutive number of detectable portions 32B to be consecutively omitted from detection in high speed rotations.

In case of the rotary body 31B shown in FIG. 13, nine detectable portions 32B are provided at uniform intervals, omitting three detectable portions from between the opposite ends of the uniformly spaced detectable portions 32B to form a nonuniformly spaced interval. Accordingly, at a high speed rotation, the detection process can consecutively omit the detection of the detectable portions 32B up to 2 at maximum.

Figure 14:
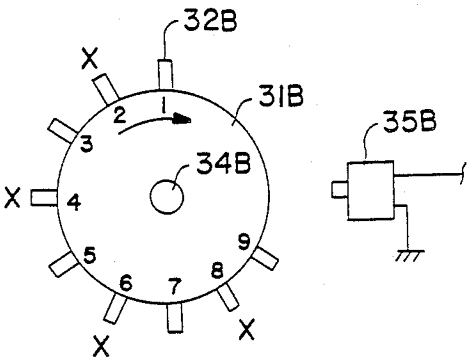
FIG. 14 is a diagrammatic illustration explanatory of the omission of some detectable portions from detection during high speed rotation.
Figure 15:
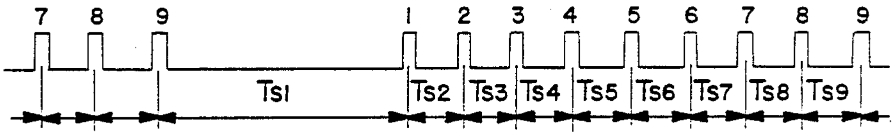
FIG. 15 is a diagram showing a pulse pattern during low speed rotation.
Figure 16:
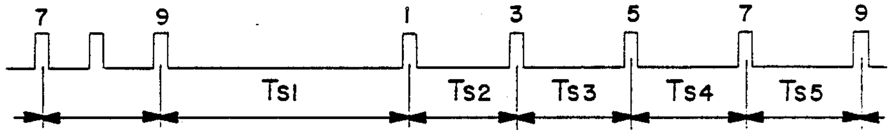
FIG. 16 is a diagram showing a pulse pattern during high speed rotation, omitting part of the detectable portions.

When a device of such an arrangement is used for detecting the nonuniformly spaced portion as a reference position during rotation of the rotary body 31B, every other detectable portions 32B in uniformly spaced positions are omitted from the detection in high speed rotation as shown in FIG. 14, skipping the detectable portions 32B marked with a "cross" in the same figure. Therefore, the pulse pattern which is produced at the output of the sensor 35B and processed by CPU 38B contains pulses rising at the respective detectable portions in low speed rotation with time intervals corresponding to the rotational speed as shown in FIG. 15, namely, with time intervals $T_{si}$ (i=2, 3, . . . 9) between the detectable portions 32B in the uniformly spaced portions and a time interval $T_{s1}$ between the ninth and first detectable portions 32B of the nonuniformly spaced portion. In high speed rotation, the pulses at the omitted detectable portions 32B disappear as shown in FIG. 16, and the time intervals of the uniformly spaced portions are broadened, producing a reduced number of pulses at elongated time intervals $T_{si}$ (i=2, 3, 4, 5).

Figure 17:
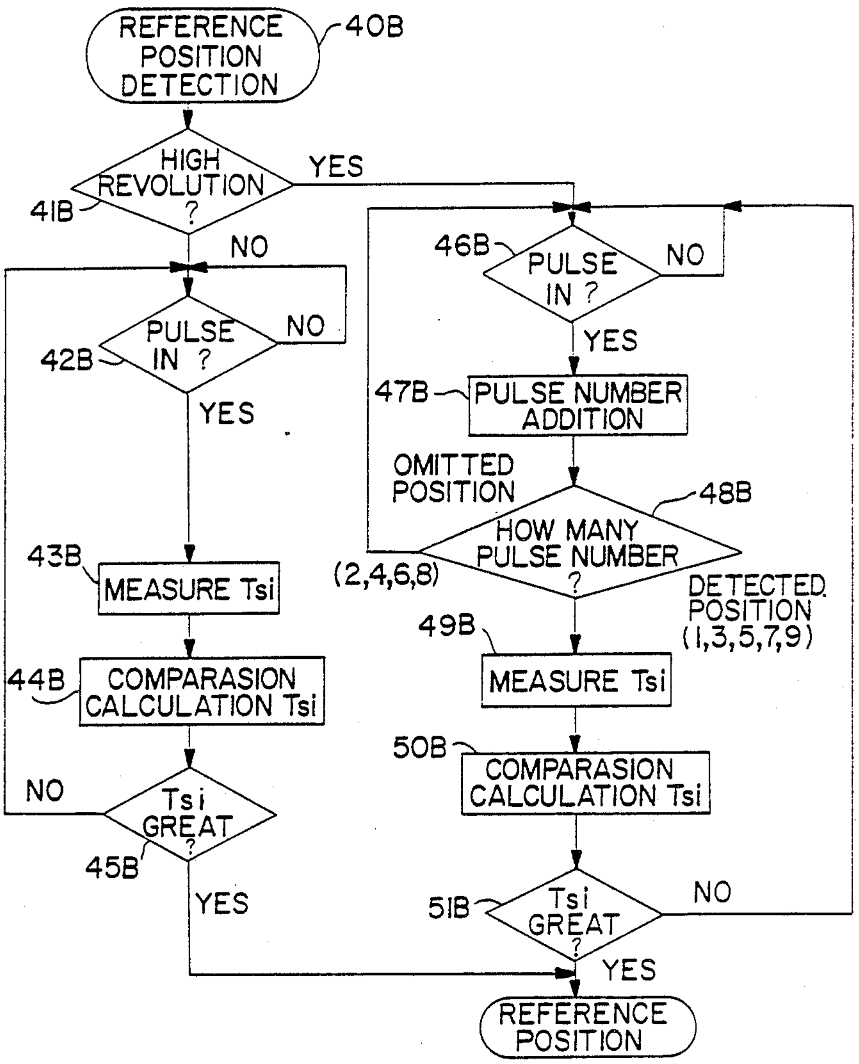
FIG. 17 is a flowchart of a reference position detecting sequence omitting part of the detectable portions during high speed rotation.

Referring to FIG. 17, there is illustrated an example of the sequence for switching the mode of detection, in which on entering a reference position detecting routine 40B whether or not the rotational speed is high is first checked by the use of the sum of the time intervals $T_{si}$ in one or a certain number of revolutions. The level where the range of high speed rotation starts varies depending upon the condition of use. For example, it is demarcated at the level of 5000 or 3000 revolutions per minute and determined by comparison with a time $T=\Sigma T_{si}$ which is required for one revolution of the rotary body 31B (Step 41B).

In a range lower than a predetermined rotational speed, the sequence advances in the direction of NO and in a higher range in the direction of YES. In the case of NO (in a range of low rotational speed), a check is made to see whether or not a pulse appears at the input of CPU 38B every time a detectable portion 32B is detected by the sensor 35B, advancing in the direction of YES if the answer is affirmative. If negative, the sequence goes back to repeat the same step until the answer becomes affirmative (Step 42B). If affirmative, the sequence advances in the direction of YES to measure the lengths of the time intervals $T_{si}$ between the pulses (Step 43B), comparing and computing to see if any of the time intervals $T_{si}$ is a maximum value in one revolution or greater than a particular reference value (Step 44B), and, if a time interval $T_{si}$ is a maximum value or greater than a reference value, verifying detection of the reference position and advancing in the direction of YES to end this routine. If the time interval is not large enough, the sequence advances in the direction of NO and returns to Step 42B (Step 45B).

In a range higher than a predetermined rotational speed, the sequence advances in the direction of YES from Step 41B to check if a pulse has been received at the input of CPU 38B every time a detectable portion 32B is sensed by the sensor 35B, thence advancing in the direction of YES if a pulse has been received and returning to the last step if not to repeat it until the answer becomes affirmative (Step 46B). If a pulse has been received, the sequence advances in the direction of YES to add the pulse number (Step 47B), returning to Step 46B when the pulse number indicates a detectable portion 32B in an omitted position, and advancing to the next step when the pulse number indicates a detectable portion 32B in a position for detection of the reference position (Step 48B). Upon reaching a detectable portion 32B in the sensing position, a time interval $T_{si}$ from a previous sensing position is measured (Step 49B) to see if the time interval $T_{si}$ is a maximum value in one revolution or greater than a predetermined reference value (Step 50B). If the time interval $T_{si}$ is a maximum value or greater than the reference value, it is verified as the reference position, and the sequence advances in the direction of YES to end this routine. If the value is not large enough, the sequence goes in the direction of NO to return to Step 46B (Step 51B).

By processing the pulses according to this sequence, namely, by discriminating the reference position by the use of the pulses occurring at all of the detectable portions 32B in a low rotational speed range to preclude erroneous detections due to fluctuations in rotation, while elongating the pulse intervals to a substantial extent in high speed rotation by omitting every one or more pulses from the pulses occurring at the detectable portions in the uniformly spaced portions, it becomes possible to adapt the processing of CPU 38B to high speed rotations.

Figure 18:
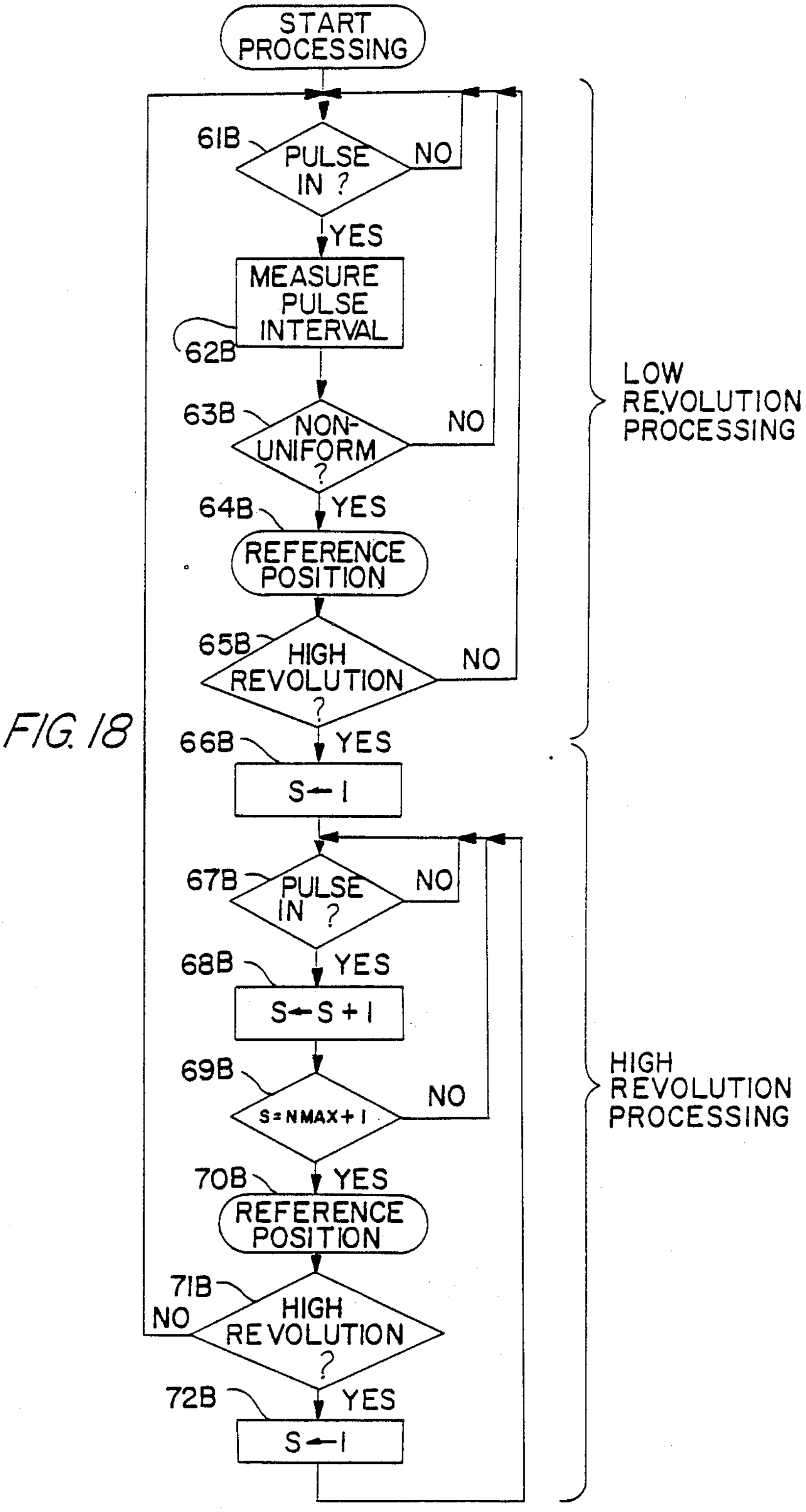
FIG. 18 is a flowchart of a sequence restricting the process to the counting of the detectable portions after detection of the reference position during high speed rotation.
Figure 19:
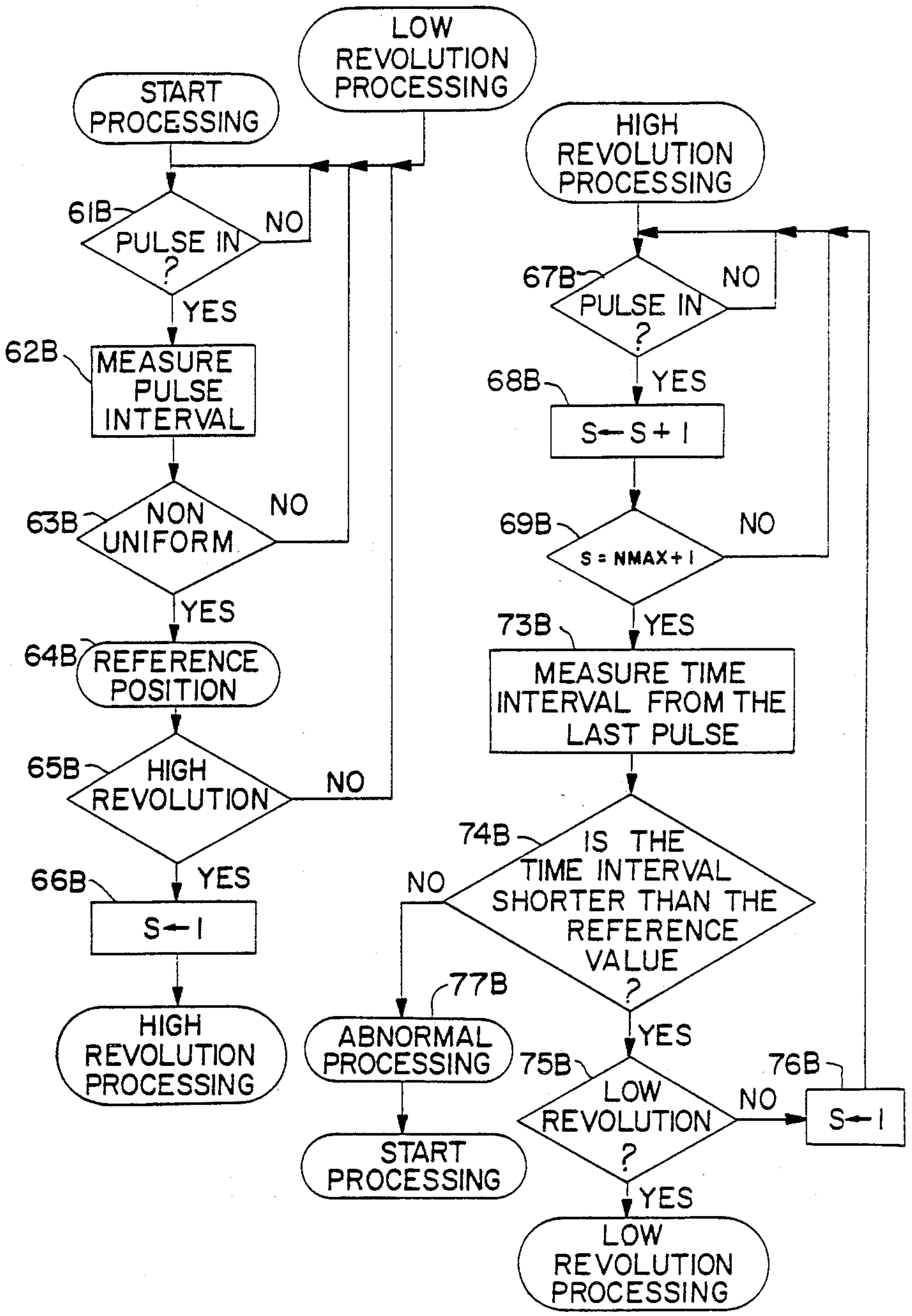
FIG. 19 is a flowchart of a sequence for checking abnormalities during high speed rotation.

For simplifying the process of discriminating pulses occurring at the detectable portions in high speed rotation, FIG. 18 shows another sequence which is arranged to count the number of uniformly spaced detectable portions 32B after detection of a nonuniformly spaced portion to find a next nonuniformly spaced portion. More specifically, at the start a check is made to see if the pulses from the sensor 35B have been transmitted to the input of CPU 38B through the shaper circuit 37B. The sequence advances in the direction of YES if the answer is affirmative and in the direction of NO for return to the last step if negative, repeating the same step until the pulses are transmitted (Step 61B). If the pulses have been transmitted and the sequence advances in the direction of YES, the lengths of time interval $T_{si}$ between the pulses are measured (Step 62B), comparing and computing to see if the time interval $T_{si}$ is a maximum value in one revolution or greater than a specific reference valute, verifying detection of a nonuniformly spaced portion if a time interval $T_{si}$ is a maximum value or greater than a predetermined reference value and advancing in the direction of YES. If not large enough, the sequence returns to repeat Step 61B (Step 63B). Advancing in the direction of YES by detection of a nonuniformly spaced portion, the detected nonuniformly spaced portion is used as a reference position in the subsequent discriminating process (Step 64B). Next, a check is made to see if the operation is in a high speed range on the basis of the time intervals $T_{si}$ between the pulses, advancing in the direction of NO if the answer is negative and in the direction of YES if affirmative (Step 65B). Advancing to YES at Step 65B, the pulse counter S is set to 1 (Step 66B). Then a check is made to see if the next input pulse has been received, advancing to YES if the answer is affirmative and to NO if negative, repeating the same step until the next pulse is received (Step 67B). If the sequence advances to YES, 1 is added to the pulse counter S (Step 68B). The pulse counter S is checked to see if it has been added to a count corresponding to one revolution of the rotary body 31B, namely, to see if it is equal to the number NMAX of the detectable portions 32B plus 1. The sequence returns to the last step 67B if one revolution has not been made, and advances in the direction of YES if one revolution has been made (Step 69B). Advancing to YES after recognition of one revolution, it is verified to be a recurrence of the reference position determined at Step 64B (Step 70B). Whether or not the operation is in high rotation is checked again, returning to Step 61 if NO or in low speed rotation, and advancing to YES if in high speed rotation (Step 71). In the case of high speed rotation, the sequence advances to YES to replace the pulse counter by 1, followed by an advancement to Step 67B (Step 72B). In this sequence, a judgment as to whether the operation is in high speed rotation or not can be made easily by substituting a given rotational speed into XN of the following equations, for comparison with obtained values. If the rotational speed in steady-state rotation is XN, the time interval $T_s$ (sec.) of the nonuniformly spaced portion is $$T_{si} = (\alpha/360) \times (60/XN) \ldots \quad (2)$$

and the time interval $T_{si}$ (i=2, . . . N) of the uniformly spaced portion is $$T_{si} = (\beta/360) \times (60/XN) \ldots \quad (3)$$

By so doing, the processing of the pulses in high speed rotation can be simplified to a considerable degree, permitting to process the pulses in such a manner as to ensure appropriate engine control and with improved adaptability in high speed rotations.

Figure 28:
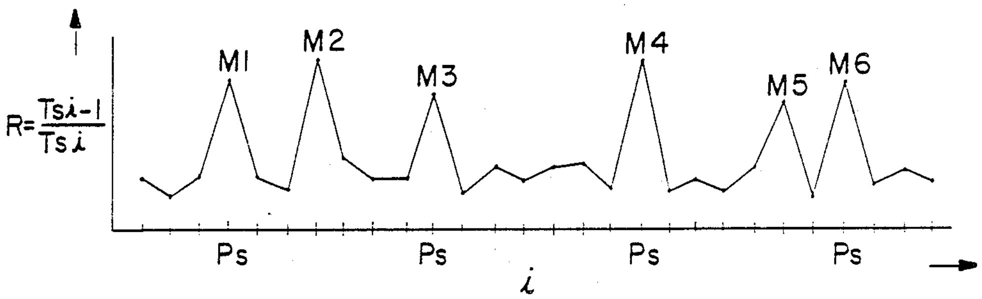
FIG. 28 is a graph plotting the results of analysis by the use of the embodiment as illustrated in FIG. 23, with regard to time ratios in the respective stages in a case where fluctuations occur to the rotation under influence of road surface conditions.

In order to simplify the pulse processing in high speed rotation to substantially only the sequence of adding 1 to the pulse counter, there arises a necessity for adding a sequence which precludes count errors as caused, for example, in the event that count of the pulse counter S is increased by a noise which creeps into the pulse output line due to an abnormality, or when the count of the pulse counter S becomes deficient due to a pulse output failure resulting from a line disconnection or faulty contact. As shown in FIG. 28, the sequence for confirming this aspect checks if the count of the pulse counter S coincide with S=NMAX=1, a value for one revolution of the rotary body 31B, upon entering the processing for high speed rotation, the count of the pulse counter becomes S=NMAX+1 which stands for one revolution of the rotary body 31B. When the sequence advances in the direction of YES at Step 69B, the time interval $T_s$ between a preceding pulse and a currently received pulse is measured (Step 73B) to check whether or not it is shorter than a preset reference value larger than a value as obtained by substituting a specified rotational speed into XN of Equation (3), advancing to YES if it is shorter and to NO if longer (Step 74B). In an affirmative case, the process is treated as normal, checking whether or not the operation is in low rotational speed (or high rotational speed), advancing to the low speed process (to YES) if in low speed rotation and continuing the high speed process if in high speed rotation (Step 75B). The low speed process is effected from Step 61B. When continuing the high speed process, the sequence advances to NO at Step 75 to alter the value of the pulse counter S (Step 76B), returning to Step 67B. If the time interval is found to be longer than the reference value at Step 74B, the process is regarded as abnormal and the sequence goes to NO branch for return to Step 61B to effect a process for an abnormal case, detecting the reference position for each pulse in the same manner as in low speed process (Step 77B).

In this manner, on the basis of the nonuniformly spaced portion which corresponds to the reference position, an abnormality is instantly detected by confirming that the time interval between the immediately preceding pulses has a time length of the uniformly spaced portion 32, permitting to avoid its adverse effect easily.

Figure 20:
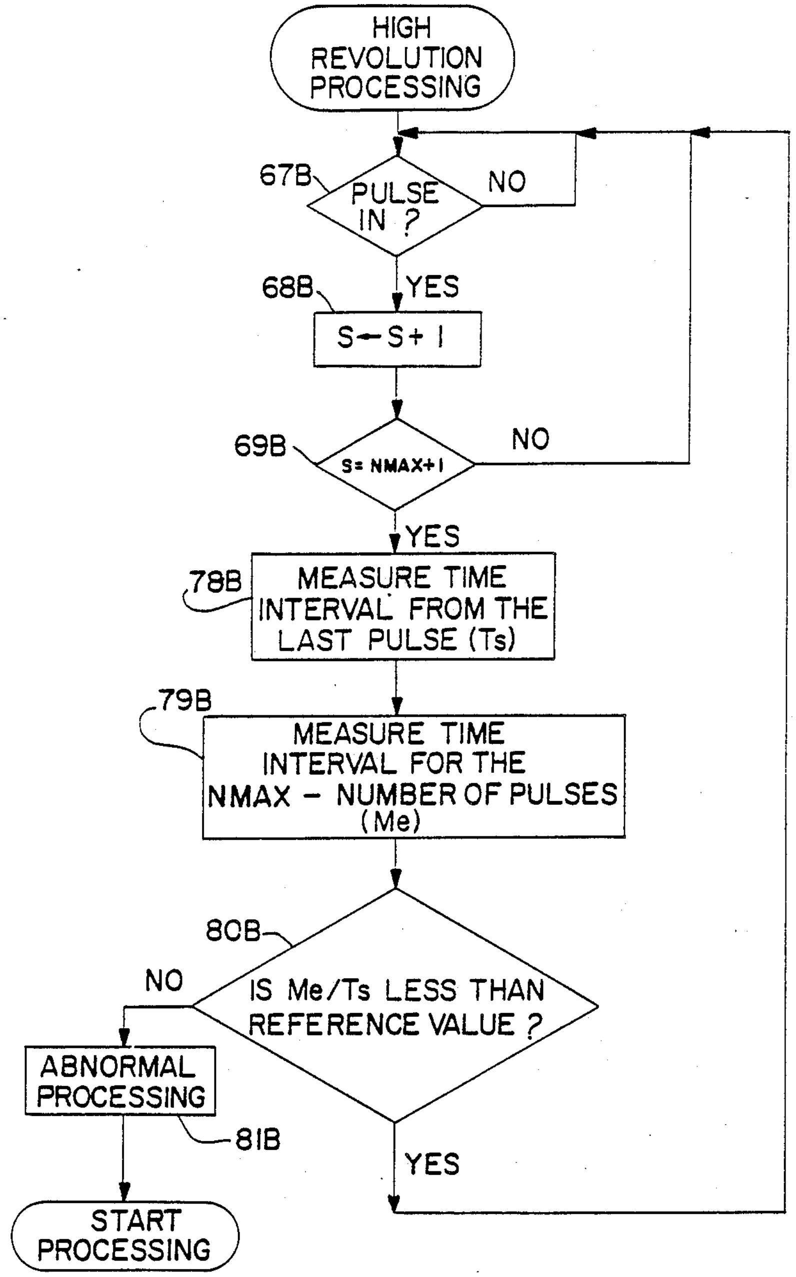
FIG. 20 is a flowchart of another sequence for checking abnormalities during high speed rotation.
Figure 21:
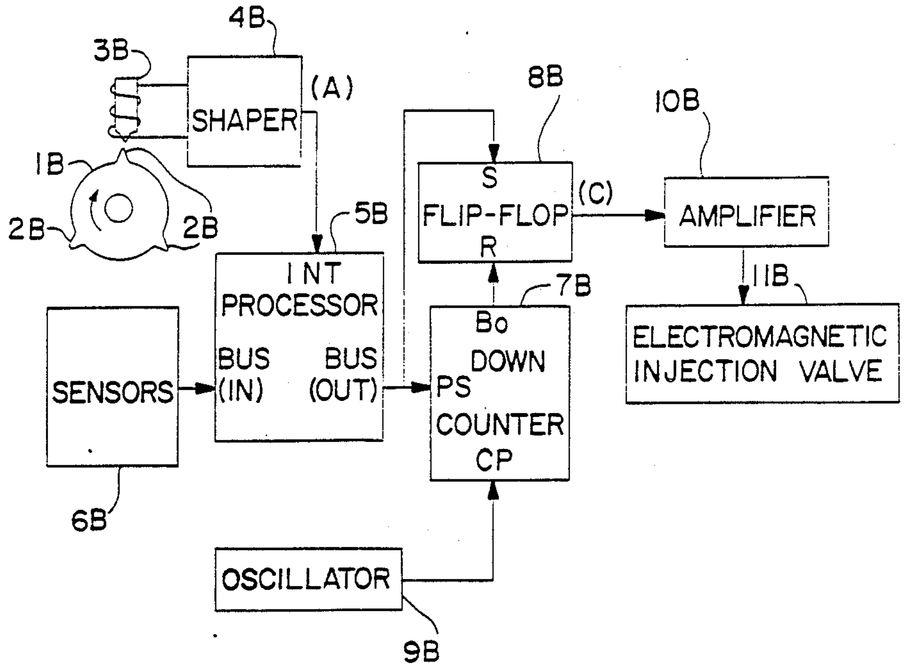
FIG. 21 is a diagrammatic illustration of a conventional engine control system.
Figure 22:
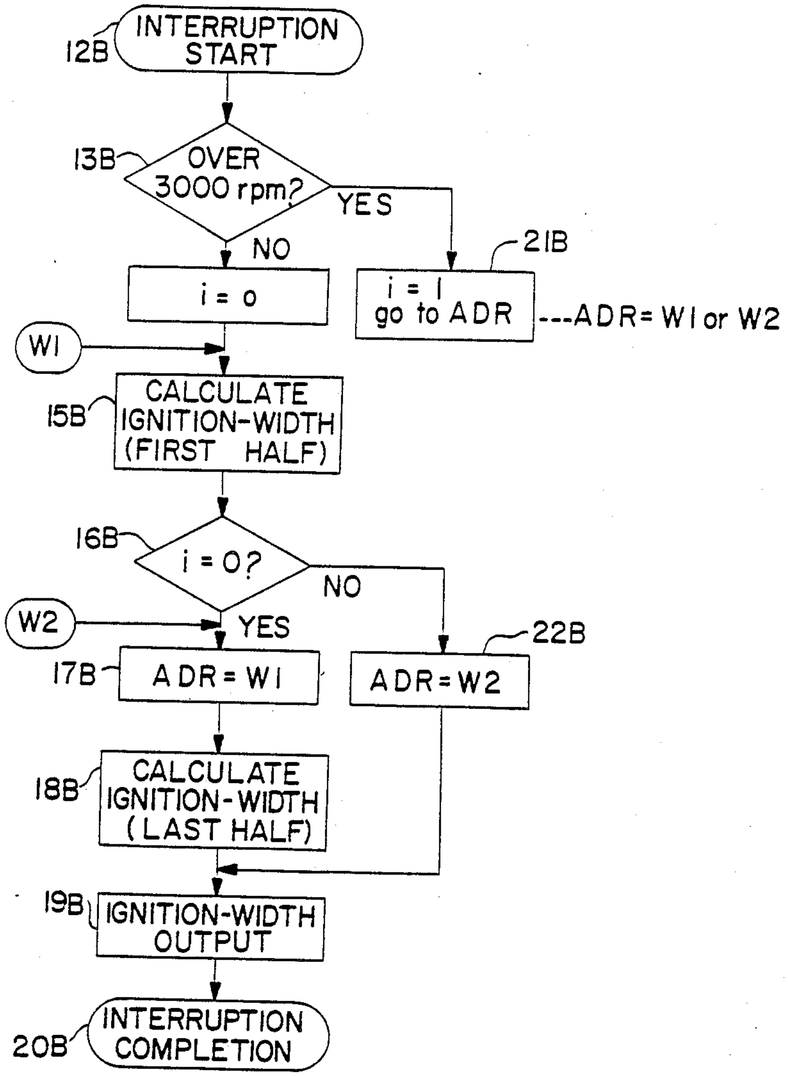
FIG. 22 is a flowchart showing an example of the process performed by the conventional engine control system.

FIG. 20 shows another example of the sequence for confirmation, in which on entering the high speed process the sequence advances to YES line from Step 69B as soon as the count of the pulse counter S reaches the value for one revolution of the rotary body 31B, measuring the time interval $T_s$ between a preceding pulse and a currently received pulse (Step 78B), and adding up the time intervals of the respective pulses to obtain a time Me of one revolution of the rotary body 31B (Step 79B), and making a check to see if a time ratio $Me/T_s$, a ratio of the time for one revolution to the time interval of the nonuniformly spaced portion, is greater than a preset reference value, advancing in the direction of YES if smaller than that value and in the direction of NO if greater (Step 80B). If YES, the processing is regarded as normal and returned to Step 67B. If NO, the processing is regarded as abnormal, executing an abnormal process (Step 81B) and returning to Step 61B to detect the reference position on occurrence of each pulse in the same manner as in the low speed process.

Since the reference value varies according to the rotational speed, this sequence of confirmation can be applied to a wide range of rotation to discriminate abnormalities with high accuracy.

Thus, in this embodiment, the pulses of the detectable portions 32 on the rotary body 1 are processed either in a range which satisfies the condition of Equation (1) or by restricting same to the confirmation of the number of the detectable portion 32B based on a once detected reference position as long as it is free of abnormalities, thereby carrying out the process effectively in a high speed rotation range with improved adaptability to speed.

It will be appreciated from the foregoing description that the present invention includes: a plural number of detectable portions which are provided around the circumference of a rotary body at uniform intervals except for at least one nonuniformly spaced detectable portion; a sensor which is located close to the rotary body for sensing the detectable portions; and a control circuit arranged to receive the output of the sensor to discriminate the reference position of the rotary body and to produce output engine control signals according to the detected reference position, the control circuit being adapted to omit part of the process of the reference position detection in a high speed range to shorten the processing time. By the omission of part of the reference position detecting process in high speed rotation, it becomes possible to reduce the absolute amount of the real-time processing by the control circuit to execute the contents of the process easily in step with the cycle of the reference position detection even in a high speed rotation range to facilitate the engine control in high speed rotation.

Figure 23:
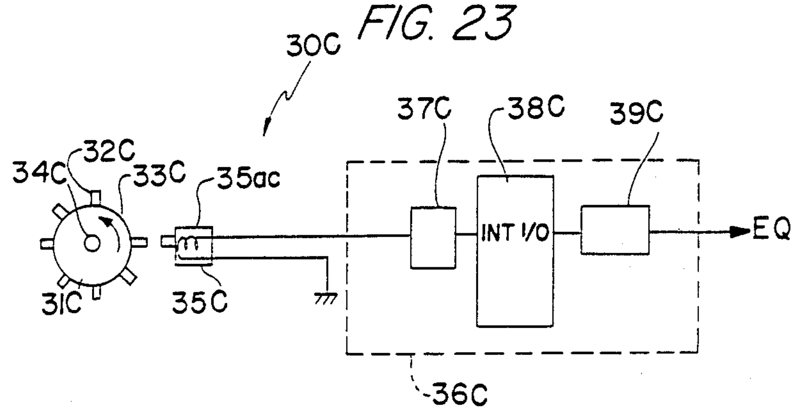
FIG. 23 is a diagrammatic illustration of an embodiment of the device for detecting the reference position on a rotary body according to the present invention.

FIG. 23 illustrates a fourth embodiment of the invention, n-number ($n=7$ in this particular embodiment) of rectangular projections 32C are provided around the circumference of a rotary body 31C of a reference position detecting device 30C to form detectable portions in uniformly spaced positions by dividing the circumference of the rotary body into $n+1$ equal portions, except that the rectangular projections in $n+1$ position is omitted to form a nonuniformly spaced portion 33C. As a sensor for detecting the presence or absence of the rectangular projections on the rotary body 31C which is rotated about a shaft 34C, a pulser coil 35C is located in a position closely confronting the circumference of the rotary body 31C, grounding one terminal end of the coil **35*ac* while connecting the other end to a control circuit 36C. The control circuit 36C includes a waveform shaper circuit 37C which is connected to the pulser coil 35C, a central processing unit (hereinafter referred to simply as "CPU" for brevity) 38C which has its interrupt terminal connected to the output terminal of the waveform shaper circuit 37C, and an amplifier circuit 39C which has its input terminal connected to the output of CPU 38C. Output of the control unit 36C is supplied to a fuel injector, an ignition system, an engine control unit or other controlling equipments EQ by connecting the output of the amplifier circuit 39C** thereto for supply of control signals.

Figure 24:
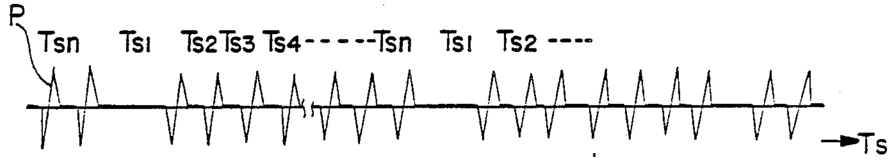
FIG. 24 is a diagram of a pulse pattern resulting from measurement of the rotary body according to the invention.

The pulser coil 35C produces pulses P of a periodic pattern in synchronism with revolutions of the rotary body 31C as shown in FIG. 24. Of stages S which intervene the respective pulses with time intervals $T_s$, the stage which corresponds to the nonuniformly spaced portion 33C has a time length $T_{s1}$ while the stages of other uniform intervals has a time length $T_{si}$ ($i=2, 3, \ldots n$).

Figure 25:
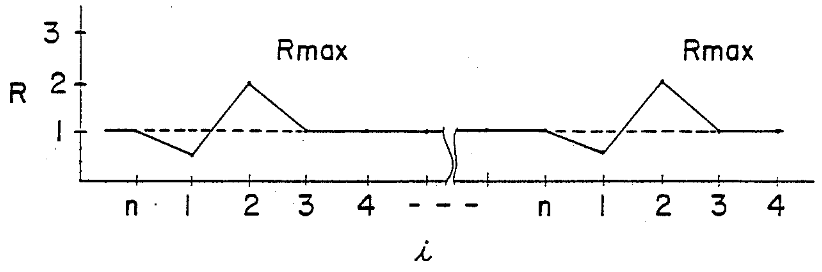
FIG. 25 is a graph plotting time ratios in the respective stages obtained as a result of measurement of the rotary body according to the invention.

Time ratio $R=T_{si-1}/T_{si}$ and hereafter referred to as R-value... The R-values of the pulses shown in FIG. 2 are plotted in FIG. 25 in which the horizontal axis represents the count i of the pulses and the vertical axis the R-value. As seen therein, $R=1$ at the uniform intervals, and $R\neq 1$ at the nonuniformly spaced portion 33C, showing a maximum value Rmax in R-value ($R=T_{si}/T_{s2}$) where the denominator is the time interval $T_{si}$ of the nonuniformly spaced portion 33C and the numerator is the time interval $T_{s2}$ of the uniformly spaced portion.

Figure 26:
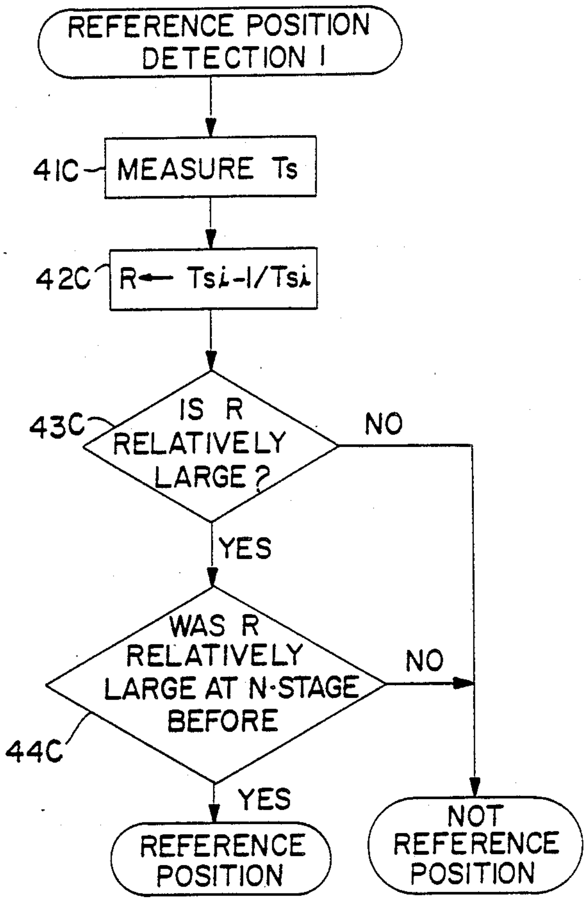
FIG. 26 is a flowchart showing the sequence in the first course of the reference position detection process in the embodiment of the invention as illustrated in FIG. 23.

In the first course of the sequence for detecting the reference position by CPU 38C, the time intervals $T_s$ of the respective stages are measured in the first place (Step 41C) as shown in FIG. 26; computing the time ratio $T_{si-1}/T_{si}$ of the measured time intervals $T_s$ and storing the results in register R (Step 42C); and comparing whether or not the values in register R are large (Step 43C). Whether or not the values in register R are large may be determined either by checking if they are a peak value in one revolution of the crankshaft or by comparison with a predetermined value Ro. If found to be large, it is compared to check if R-value in n-stage one period before is large (Step 44C). If large, the i-stage with the R-value is discriminated as the reference position, proceeding to the next sequence. If the R-value compared at Steps 43C and 44C is small, the n-stage with the small R-value is not recognized as the reference position, and the process proceeds to the next stage.

Figure 27:
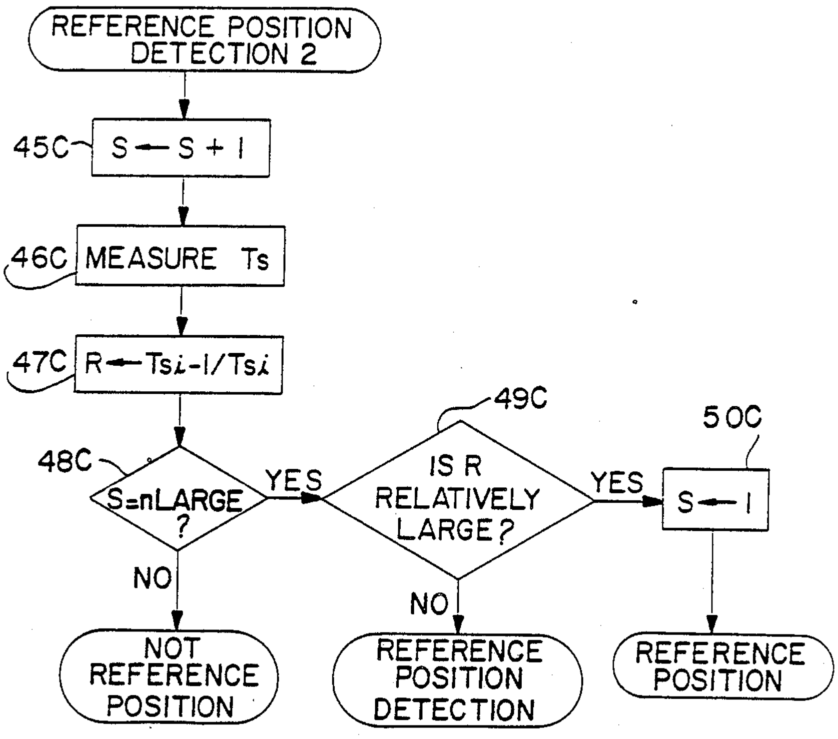
FIG. 27 is a flowchart showing the sequence in the second and following courses of the reference position detection process in the embodiment as illustrated in FIG. 23.

Using the reference position which is detected in the first course, the number of the stages is incremented by 1 in the second and succeeding courses as shown in FIG. 27 (Step 45C), followed by the sequence of: measuring the time interval $T_s$ of each one of the new stages S (Step 46C); computing the time ratio $T_{si-1}/T_{si}$ of the measured time interval $T_s$ and storing the results in register R (Step 47C); making comparison to check if the stages S of the measured time lengths $T_s$ correspond to the maximum number n of stages (Step 48C); if the stages S correspond to the maximum number n of stages, it means that the rotary body 31C has completed one revolution, and the time ratio $T_{si-1}/T_{si}$ stored in register R at Step 47C is compared to check if it is large (Step 49C); if large, the stage S is set to 1 (Step 50C). At this time, the value of register R is the R-value which corresponds to the reference position, indicating detection of the true reference position. If the stage S is found to be unequal to the maximum stage number n at Step 48C, it means that the rotary body 31C has not made one revolution, indicating that the unmatching reference position detected in the first course means is not the true reference position. If the R-value at Step 49C is not large, the sequence returns to Step 41C to repeat the detection of the initial reference position.

Figure 29:
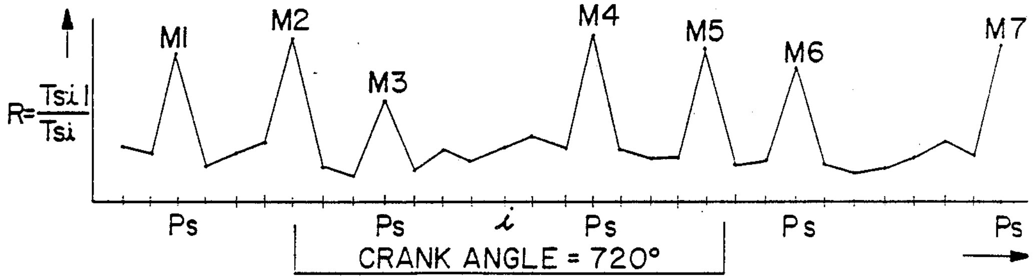
FIG. 29 is a graph also plotting the results of analysis by the use of the embodiment as illustrated in FIG. 23, with regard to time ratios in the respective stages in a case where fluctuations occur to the engine rotation.

Thus, instead of finding a maximum value in one revolution, this embodiment is adapted to detect a large time ratio $T_{si-1}/T_{si}$ and to discriminate false values due to rotational fluctuations. Accordingly, when a motor vehicle is running on a road with an inferior surface condition which causes irregular fluctuations in rotation, maximum values appear in random positions as indicated at M2 and M5 in FIG. 28 in addition to M1, M3, M4 and M6 which correspond to the reference position Ps, these peaks due to rotational fluctuations and without periodical repeatability can be distinguished easily. Besides, in case of a four-cycle single cylinder engine which involves rotational fluctuations as a result of compression and explosion strokes of the engine, a peak value due to such a rotational fluctuation appears at every 720° rotation of the crankshaft as indicated at M2 and M5 in FIG. 29 since the compression and explosion of the engine takes place every 720° rotation as shown in the same figure. However, these peak values M2 and M5 can be easily distinguished from peak values M1, M3, M4 and M6 of the reference position Ps and excluded to detect the reference position Ps correctly in spite of large rotational fluctuations.

Figure 30:
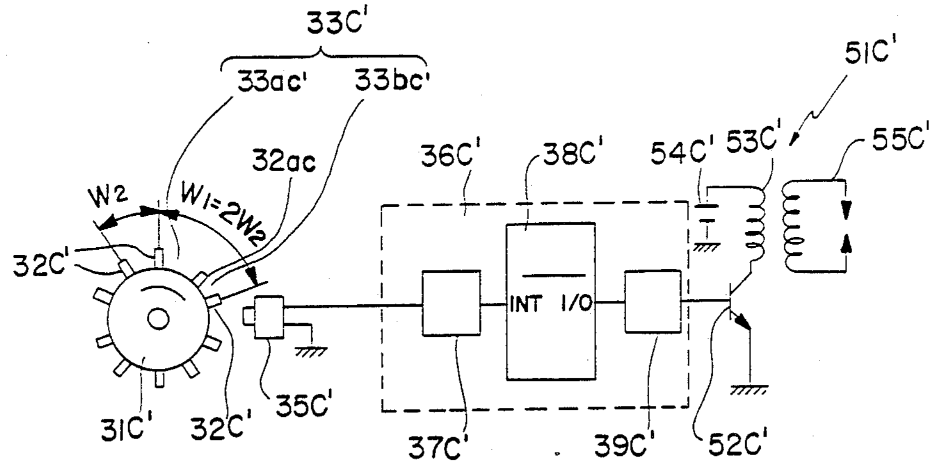
FIG. 30 is a diagrammatic illustration of another embodiment of the device for detecting a reference position on a rotary body according to the present invention.

Referring to FIG. 30, there is illustrated another embodiment of the invention, in which n−1 rectangular projections 32C′ are provided in n-number of uniformly spaced positions around the circumference of the rotary body 31C′, and the remaining n-th rectangular projection **32*ac*′ is located in a position deviated toward an adjacent rectangular projection 32C′ to form a nonuniformly spaced portion 33C′ with a wide interval and a narrow interval side-by-side such that the width (or angle) $W_1$ of wide interval 33*ac*′ plus narrow interval 33*bc*′ corresponds to double the width (or angle) $W_2$ of the uniformly spaced interval, that is to say, $W_1=2W_2$. A pulser coil 35C′ is provided as a sensor and connected to a control system 36C′** in the same manner as in the foregoing first embodiment.

As an example of the equipments EQ connected to the output of the control circuit 36C, in a case where a transistor type ignition system 51C′ is connected thereto, the base of a power transistor 52C′ is connected to the output terminal of the amplifying circuit 39C′ of the control system 36C′ as shown in FIG. 30, grounding the emitter of the power transistor 52C′ and connecting the collector to one terminal of primary winding of the ignition coil wire while connecting the other terminal to a power source 54C′. A spark plug 55C′ is connected to the secondary winding of the ignition coil 53C′ to produce sparks by turning on and off the transistor 52C′ by the signals from the control circuit 36C′.

In order to select the reference position for control of the ignition timing of the spark plug 55C′, the rotary body 31C′ is mounted on the engine crankshaft for detecting the rotational angle of the crankshaft by way of the rotational angle of the rotary body 31C′.

Similar to the previous embodiment, the intervals between the output pulses of the pulser coil 35C′ are called stages S with time intervals $T_s$, namely, a wide time interval $T_{si}$ at the nonuniformly spaced portion **33*ac*′ and a predetermined time interval $T_{si}$ (i=2, 3, . . . n) between the uniformly spaced rectangular projections 32C′**. The time ratio $R=T_{si-1}/T_{si}$ (i=1, 2, . . . n).

Large fluctuations occur mostly in a rotational range between start and 3000 r.p.m. since fluctuations are far less during starting where the crankshaft is rotated by the starting motor and in high speed ranges over 3000 r.p.m. where fluctuations are suppressed by the inertia of the crankshaft mass. Therefore, the speed of detection as well as the adaptability to high speed rotation of the movement and control can be enhanced by applying a simplified method of detection in starting and high speed ranges.

In the sequence for detection of the reference position, a peak value in time ratio $R=T_{si-1}/T_{si}$ during one revolution is regarded as the reference position in a starting operation, going to an interrupt process in a speed range below 3000 r.p.m., and going to a main routine in a speed range higher than 3000 r.p.m.

Figure 31:
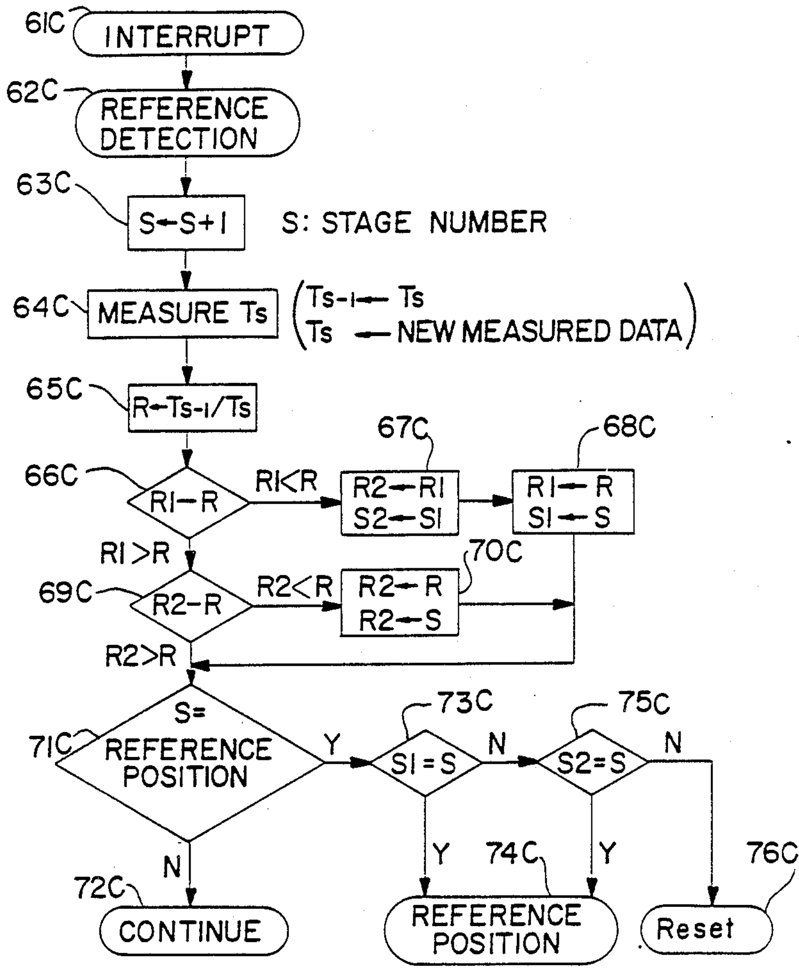
FIG. 31 is a flowchart of a sequence of an interrupt process in the embodiment as illustrated in FIG. 30.

With respect to the sequence of the interrupt process, CPU 38C′ of the control circuit 36C′ switches the reference position detection to the interrupt routine when the engine speed is lower than 3000 r.p.m. as shown in FIG. 31 (Steps 61C and 62C), upshifting up the stage number by 1 (Step 63C), replacing the stored time interval $T_s$ by an immediately preceding time interval $T_{s-1}$ and storing a freshly measured time interval $T_s$ (Step 64C). A time ratio $R=T_{si-1}/T_{si}$ is computed from the thus obtained time interval $T_s$ and the previous time interval $T_{s-1}$ (Step 65C). This time ratio R is compared with the maximum value R1 of previously obtained time ratios R (Step 66C), and, if R is greater than R1, the time ratio R and the stage number S become a new maximum time ratio R1, relocating the old maximum value R1 in R2 (Step 67C and 68C). If the time ratio R is small than R1, it is compared with a second value R2 (Step 69C). If R is greater than R2, the time ratio R and its stage number S are stored in second values R2 and S2 (Step 70C). If the time ratio R is smaller than the second value R2, the stage number S is compared to see if it is equal to the prior stage number of the reference position (Step 71C). If the stage number S is not of the reference position, the sequence for detection of the reference position is repeated again (Step 72C). If the stage number S is of the reference position, it is compared to see if it is equal to the stage number S1 of the maximum value R1 (Step 73C). If the stage number S is equal to the stage number S1 of the maximum value R1, it is verified as the reference position, the process advancing to the next stage, since the maximum value R1 is the time ratio which corresponds to the reference position (Step 74C). If the the stage number S is not equal to the stage number S1 of the maximum value R1, it is compared to see if it is equal to the stage number S2 of the second value R2 (Step 75C). If the stage number S is equal to S2, it is verified as the reference position and the process proceeds to the next as the second value R2 is also a time ratio which corresponds to the reference position (Step 74C). If the stage number S is not equal to S2, the operation is reset, determining that detection of the reference position is unnecessary (Step 76C).

Figure 32:
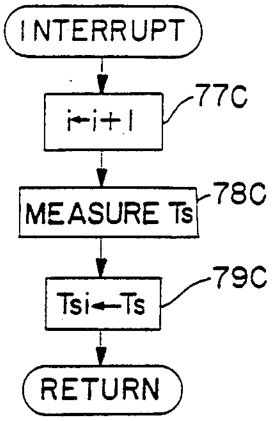
FIG. 32 is a flowchart of a sequence of an interrupt process for executing a main routine in the embodiment as illustrated in FIG. 30.

With respect to the sequence in the main routine process, first, the stage number i is upshifted by 1 by an interrupt process as shown in FIG. 32 (Step 77C), measuring the time intervals $T_s$ (Step 78C) and storing the measured time intervals $T_s$ in $T_{si}$ (Step 79C).

Figure 33:
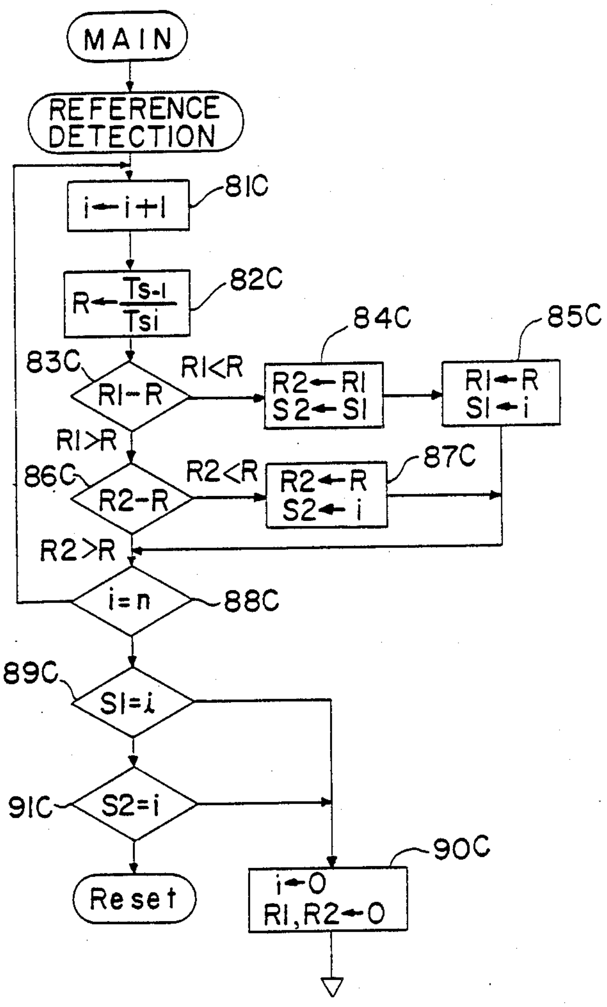
FIG. 33 is a flowchart of a sequence for processing the main routine.

On the part of the main routine, the stage number i is upshifted by 1 as shown in FIG. 33 (Step 81C), computing the time ratio $T_{si-1}/T_{si}$ and storing same in R (Step 82C and comparing the time ratio R with the peak value R1 (Step 83C). If the time ratio R is larger than the peak value R1, the data is replaced, placing the peak value R1 in the second value R2 and placing the stage number S1 in the second stage S2 (Step 84C), and placing R in R1 as a new peak value R1 and placing the stage number i in S1 as a new stage number S1 corresponding to the new peak value R1 (Step 85C). On the contrary, if the time ratio R is smaller than the maximum value R1, it is compared with the second value (Step 86C). If the time ratio R is larger than the second value R2, R is placed in R2, and its stage number i is placed in the second stage number S2 (Step 87C). If the time ratio R is smaller than the second value R2, the stage number i is compared to see if it is equal to the maximum stage number n (n=10 in the particular example shown) (Step 88C). If the stage number is not equal to the maximum stage number n, the process returns to Step 81C to repeat the sequence. If the stage number i is equal to the maximum stage number n, it is compared to see if it is equal to the stage number S1 corresponding to the maximum value R1 (Step 89C). If the stage number i is equal to the stage number S1, the stage number i, peak value R1 and second value R2 are cleared, and the control proceeds to the next (Step 90C). If the stage number i is not equal to the stage number S1, it is compared to see if it is equal to the second stage number S2 (Step 91C). In case the stage number i is equal to the stage number S2, the process goes to Step 90C and advances to the next after clearing the stage number i, peak value R1 and second value R2, while resetting when the stage number i is not equal to the stage number S2.

Figure 34:
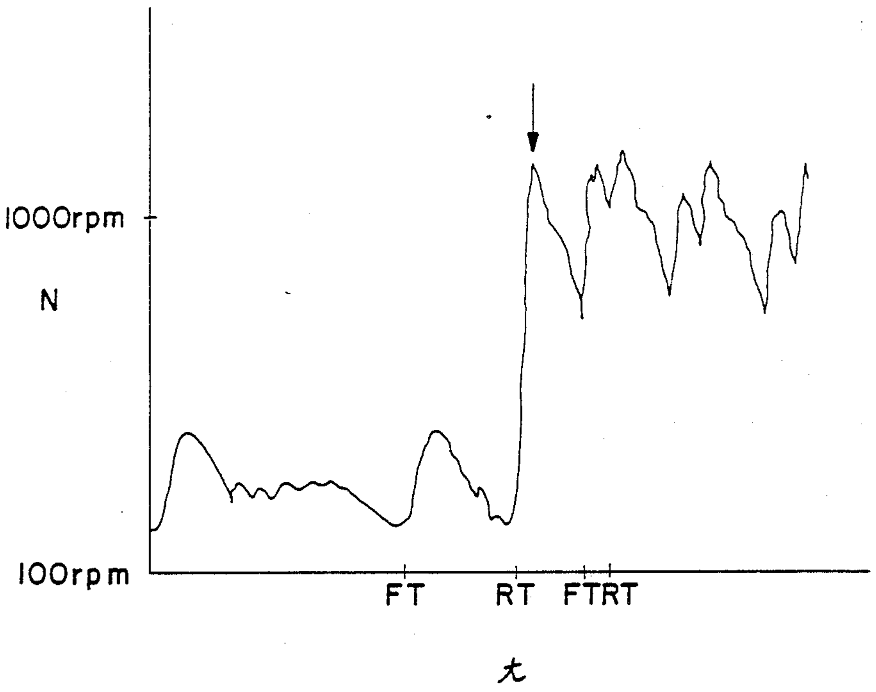
FIG. 34 is a diagram of engine starting characteristics measured by the use of the embodiment of the invention as illustrated in FIG. 30.
Figure 35:
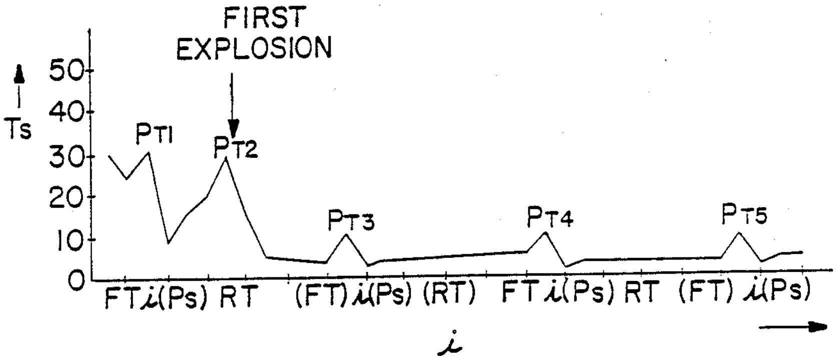
FIG. 35 is a graph plotting time lengths of the respective stage in an engine start, measured by the embodiment of the invention as illustrated in FIG. 30.
Figure 36:
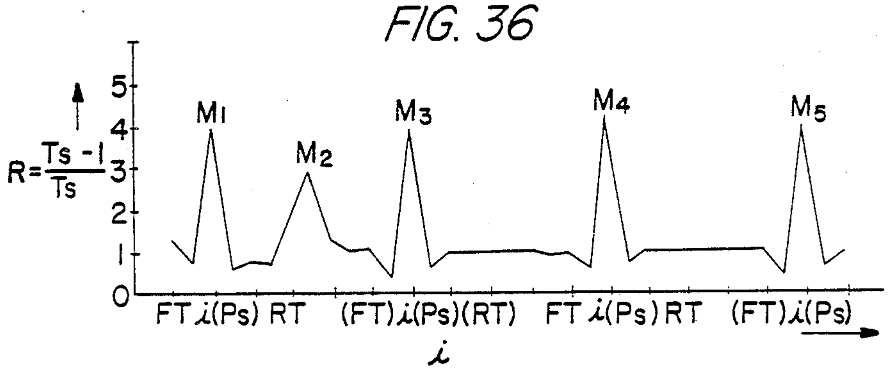
FIG. 36 is a graph plotting time ratios of the respective stages in an engine start, analyzed by the embodiment of the invention as illustrated in FIG. 30.
Figure 37:
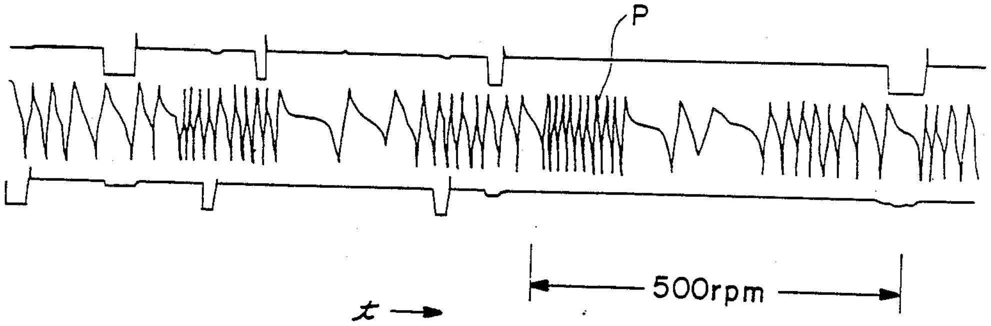
FIG. 37 is a graph plotting pulses produced over a certain time period during operation on uneven surfaces, measured by the embodiment of the invention as illustrated in FIG. 30.
Figure 38:
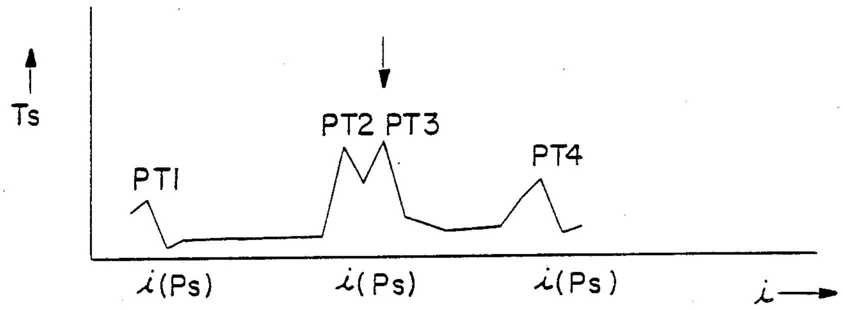
FIG. 38 is a graph plotting time lengths of the respective stages during operation on uneven surfaces, measured by the embodiment of the invention as illustrated in FIG. 30.
Figure 39:
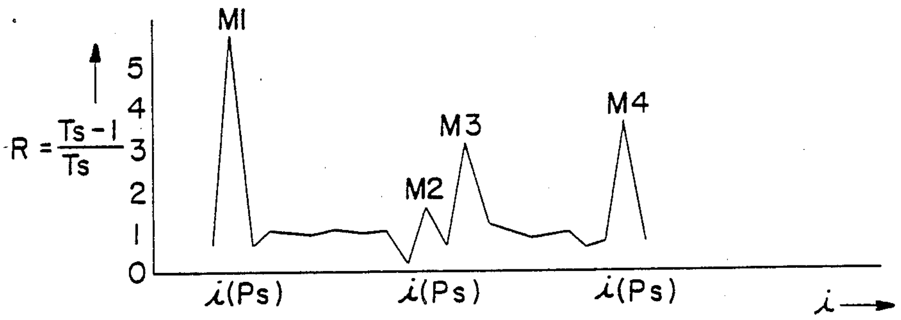
FIG. 39 is a graph plotting time ratios of the respective stages during operation on uneven surfaces, analyzed by the embodiment of the invention as illustrated in FIG. 30.
Figure 40:
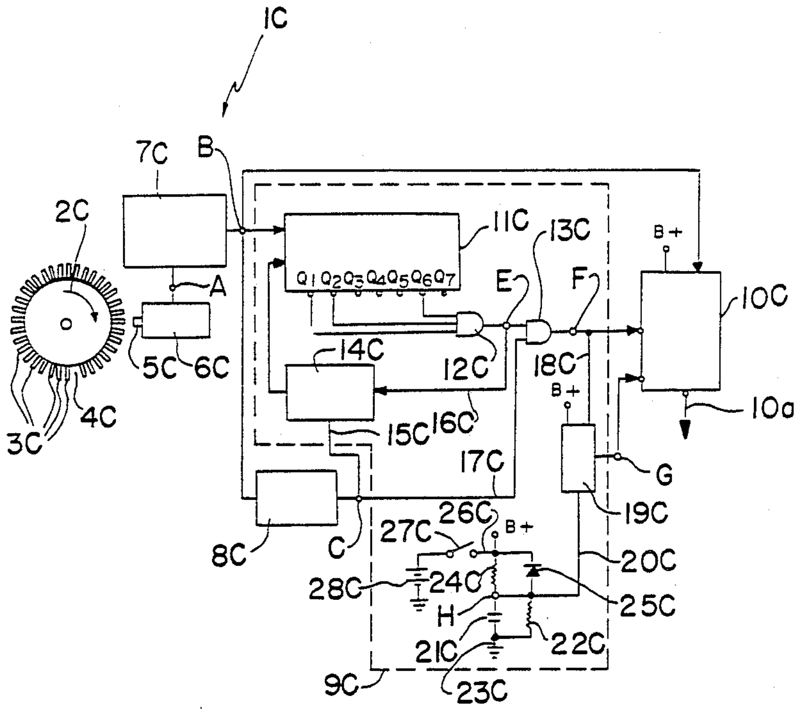
FIG. 40 is a diagrammatic illustration of a conventional device for detecting a reference position on a rotary body.
Figure 41:
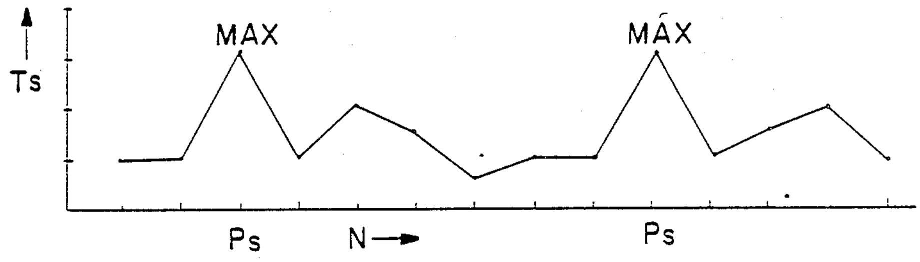
FIG. 41 is a graph plotting conventionally obtained pulses and lengths of time intervals between the respective pulses at a certain rotational speed.
Figure 42:
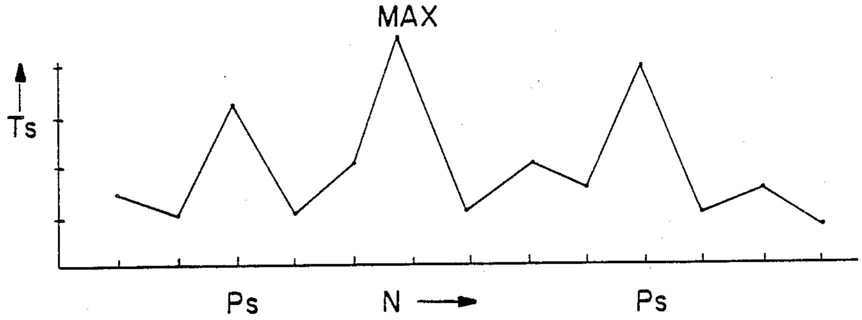
FIG. 42 is a graph plotting conventionally obtained pulses and lengths of time intervals between the respective pulses in a case involving rotational fluctuations.

In this manner, this embodiment is adapted to find the maximum value R1 and the second large value in time ratio $R=T_{si-1}/T_{si}$ to distinguish pulses of rotational fluctuations from pulses of the reference position. In case of an engine with low temperature start characteristics which contain rotational fluctuations as indicated at Ls in FIG. 34 where the axes of ordinate and abscissa represent the rotational speed N and time t, respectively, the characteristic curve of time intervals $T_s$ of the respective stages contains peaks PT (PT1, PT2 . . . PT5 in the particular example shown), and, when converted into time ratios $T_{si-1}$ in the respective stages, a peak M2 attributable to a rotational fluctuation due to initial explosion in the engine appears in addition to peaks M1 and M3 to M5 in the stage i (Ps) of the reference position Ps as shown in FIG. 36. When this false peak is eliminated, the periodical characteristics line becomes clear, facilitating discrimination of the reference position Ps. Besides, in low speed cruising on irregular road surfaces, output pulses P are obtained sequentially as shown in FIG. 37 in an operation at 500 r.p.m., which have time lengths $T_s$ in the respective stages i exhibiting a characteristics line as shown in FIG. 38, with peaks PT (PT1, PT2, PT3 and PT4 in the particular example shown). However, when converted into the time ratio $T_{si-1}/T_{si}$ as shown in FIG. 39, the peaks M1, M2 and M4 in the stage i (Ps) of the reference position Ps can be distinguished from the peak M3 which is attributable to a drop in rotation caused by a variation in surface resistance.

In a case where the nonuniformly spaced portion is narrower than the uniformly spaced portions or in a case where a smaller time ratio R is to be detected, the reference position can be detected by the same procedures employing inverse numbers for the time ratio.

Although the time ratio $R=T_{si-1}$is used in the foregoing embodiments, the same results can be obtained by employing a time difference $L=T_{si-1}-T_{si}$ instead.

It will be appreciated from the foregoing description that, according to the present invention, the reference position is determined on the basis of periodically appearing large values in time ratio $R=T_{si-1}/T_{si}$ or time difference $L=T_{si-1}-T_{si}$ of the pulse intervals, so that it becomes possible to discriminate the reference position easily without errors even in operations involving rotational fluctuations, permitting to control various equipments precisely by output control signals based on the reference position, in addition to simplification in construction and reduction of cost of the control circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A rotational position detector for controlling an internal combustion engine comprising:

a rotary body rotatable in synchronism with internal combustion engine operation;

a plurality of detectable portions disposed on said rotary body;

pulse generating means operatively positioned adjacent to said rotary body for generating a pulse output each time one of said detectable portions on said rotary body passes said pulse generating means;

measuring means for measuring time intervals between respective pulses, a preceding pulse and a present pulse, and developing an output;

an increase/decrease discriminator adapted to compare previous and present values of the output of said measuring means to check for an increase or decrease therein as compared with a predetermined value and developing an output; and memory means for storing the output of said increase/decrease discriminator for a predetermined period in an increase/decrease pattern and developing an output for controlling the operation of said internal combustion engine;

wherein the increase/decrease discriminating pattern comprises an increase/decrease time length discriminator and pattern checking means for checking malfunction of the pattern showing increase/-decrease sequence of time distance between each inputted pulse.

2. The rotational position detector according to claim 1, wherein said detector further comprises an abnormality discriminator means for determining if the pulse output of said pulse generator is a predetermined valuer on the basis of the output of said comparator means.

3. The rotational position detector according to claim 1, wherein said memory means includes a conversion means for converting the output of said increase/decrease discriminator into binary signals and a shift means for shifting bit patterns on receipt of the output of said increase/decrease discriminator for sequentially storing fresh binary signals.

4. The rotational position detector according to claim 2, wherein said memory means includes a conversion means for converting the output of said increase/decrease discriminator binary signals and a shift means for shifting bit patterns on receipt of the output of said increase/decrease discriminator for sequentially storing fresh binary signals.

5. The rotational position detector according to claim 3, wherein said predetermined increase/decrease pattern is a bit pattern formed according to the length of the interval between said detectable portions and rotational fluctuations of said rotary body resulting from engine operation.

6. The rotational position detector according to claim 5, wherein said comparator means performs said comparison by arithmetic and logic operations.

7. A device for detecting a reference position of a rotary body comprising:

a plural number of detectable portions located around the circumference of a rotary body at uniform intervals except for at least one nonuniformly spaced detectable portion;

a sensor located in a position close to said rotary body for detection of said detectable portions and developing output signals; and a control circuit responsive to said output signals of said sensor and adapted to determine a time ratio of R $(=T_{si-1}/T_{si})$ and a time length L $(=T_{si-1}-T_{si})$ from a time interval $T_{si}$ between two output signals and a previous time interval $T_{si-1}$ to determine as said reference position a position of a larger rotational angle in terms of the time ratio R $(=T_{si-1}/T_{si})$ and the time length L $(=T_{si-1}-T_{si})$, said control circuit counting each one of said detectable portions and discriminating a true reference position when a count corresponding to said reference position conforms with the count corresponding to a recurred reference position, and producing an increase/decrease output signal on the basis of the discriminating true reference position;

wherein the increase/decrease output signal pattern comprises an increase/decrease time length discriminator and pattern checking means for checking malfunction of the pattern showing increase/-decrease sequence of time distance between each inputted signal.

8. The device for detecting a reference position on a rotary body according to claim 7, wherein said larger rotational angle position in terms of said time ratio R $(=T_{si-1}/T_{si})$ and said time length L $(=T_{si-1}-T_{si})$ is determined by detecting a rotational angular position where said time ratio R $(=T_{si-1}/T_{si})$ and said time length L $(=T_{si-1}-T_{si}$reaches a maximum value in one period.

* * * * *